US006814781B2

(12) United States Patent
Tonkovich et al.

(10) Patent No.: US 6,814,781 B2
(45) Date of Patent: Nov. 9, 2004

(54) METHODS FOR SEPARATION/PURIFICATION UTILIZING RAPIDLY CYCLED THERMAL SWING SORPTION

(75) Inventors: Anna Lee Y. Tonkovich, Marysville, OH (US); Bruce F. Monzyk, Delaware, OH (US); Yong Wang, Richland, WA (US); David P. VanderWiel, Columbus, OH (US); Steven T. Perry, Galloway, OH (US); Sean P. Fitzgerald, Columbus, OH (US); Wayne W. Simmons, Dublin, OH (US); Jeffrey S. McDaniel, Columbus, OH (US); Albert E. Weller, Jr., Columbus, OH (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/288,599

(22) Filed: Nov. 4, 2002

(65) Prior Publication Data

US 2003/0131729 A1 Jul. 17, 2003

Related U.S. Application Data

(63) Continuation of application No. 09/845,777, filed on Apr. 30, 2001, now Pat. No. 6,508,862.

(51) Int. Cl.[7] ............................................. B01D 53/047

(52) U.S. Cl. .............................. 95/90; 95/114; 210/670

(58) Field of Search ................................ 95/90, 96, 99, 95/106, 114–116; 96/121, 126, 146; 210/660, 670, 676, 180, 185

(56) References Cited

U.S. PATENT DOCUMENTS

| 3,969,082 A | 7/1976 | Cairns et al. ................. 23/288 |
| 4,444,727 A | 4/1984 | Yanagihara et al. ........ 422/223 |
| 4,581,049 A | 4/1986 | Januschkowetz ............. 55/208 |
| 4,793,143 A | 12/1988 | Rhodes .......................... 62/93 |

(List continued on next page.)

FOREIGN PATENT DOCUMENTS

| EP | 0976679 | 2/2000 |
| WO | WO 00/45940 | 8/2000 |
| WO | WO 01/12312 A2 | 2/2001 |

OTHER PUBLICATIONS

PCT Written Opinion, PCT/US02/11860, mailed Jan. 27, 2003.
Viswanathan, et al., "Microscale Adsorption For Energy And Chemical Systems," May 2000, PNNL Website.
Barthels et al., "Phoebus–Julich: An Autonomous Energy Supply System Comprising Photovoltaics, Electrolytic Hydrogen, Fuel Cell," 1998, Int'l J. Hydrogen Energy, vol. 23, No. 4, pp. 295–301.
Moss et al., "Composite Metal Membranes For Hydrogen Separation Applications," 1997, National Hydrogen Association, pp. 357–365.
Reilly et al., "A New Laboratory Gas Circulation Pump For Intermediate Pressures," 1971, The Review Of Scientific Instruments, vol. 42, No. 10.
Karperos, et al., "Operating Characteristics Of A Hydrogen Sorption Refrigerator. Part 1: Experiment Design And Results," 1986, Procedings Of The Fourth Int'l Cryogenic Conference Easton, Maryland.

Primary Examiner—Frank M. Lawrence
(74) Attorney, Agent, or Firm—Frank K. Rosenberg; William Richards

(57) ABSTRACT

The present invention provides apparatus and methods for separating fluid components. In preferred embodiments, the apparatus and methods utilize microchannel devices with small distances for heat and mass transfer to achieve rapid cycle times and surprisingly large volumes of fluid components separated in short times using relatively compact hardware.

55 Claims, 10 Drawing Sheets

U.S. PATENT DOCUMENTS

| | | | |
|---|---|---|---|
| 5,308,457 A | 5/1994 | Dalla Betta et al. | 204/131 |
| 5,650,221 A | 7/1997 | Belding et al. | 442/417 |
| 5,895,519 A | 4/1999 | Lorimer | 95/56 |
| 5,948,142 A | 9/1999 | Holmes et al. | 95/99 |
| 6,126,723 A | 10/2000 | Drost et al. | 96/4 |
| 6,165,254 A | 12/2000 | Kawakami et al. | 96/125 |
| 6,293,998 B1 | 9/2001 | Dolan et al. | 95/96 |
| 6,503,298 B1 | 1/2003 | Monzyk et al. | 95/96 |
| 6,508,862 B1 * | 1/2003 | Tonkovich et al. | 95/106 |
| 6,514,319 B2 | 2/2003 | Keefer et al. | 95/101 |
| 6,630,012 B2 | 10/2003 | Wegeng et al. | 95/106 |
| 6,652,627 B1 | 11/2003 | Tonkovich et al. | 95/104 |

* cited by examiner

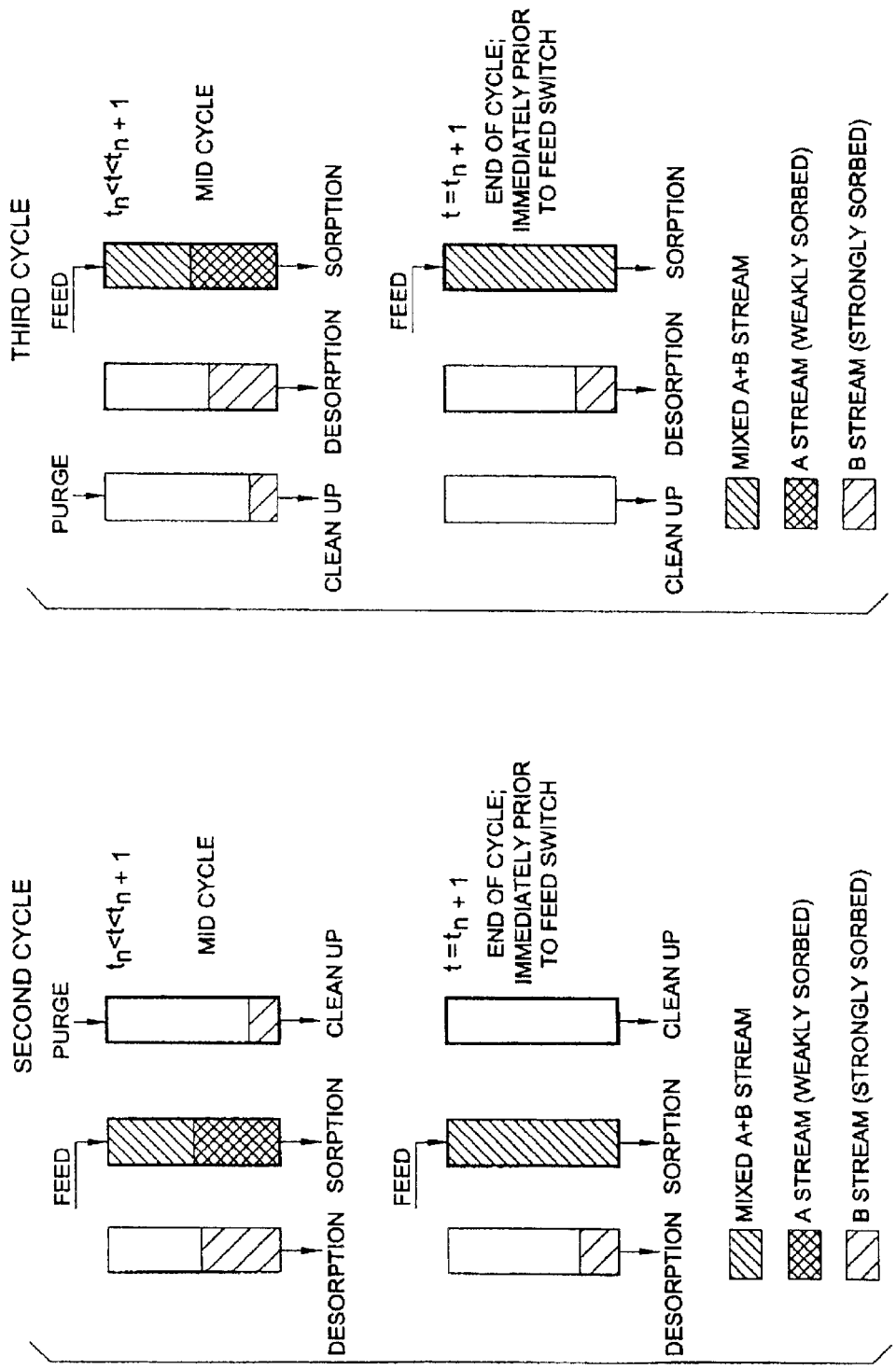

METHODS FOR SEPARATION/PURIFICATION UTILIZING RAPIDLY CYCLED THERMAL SWING SORPTION

RELATED APPLICATIONS

This application is a continuation of Ser. No. 09/845,777, filed Apr. 30, 2001, now U.S. Pat. No. 6,508,862, which is incorporated herein by reference.

This invention was made with government support under Contract DE-AC0676RLO1830 awarded by the U.S. Department of Energy. The government has certain rights in the invention.

FIELD OF THE INVENTION

The present invention relates to methods and apparatus for separation by thermally cycled sorption and desorption.

INTRODUCTION

Separation of fluid components from fluid mixtures has been a topic of great scientific and economic interest for more than 100 years. This invention concerns methods and apparatus for separating fluid components from fluid mixtures by thermally cycled sorption and desorption. Our experimental work, and much of the following descriptions, concern separating hydrogen gas. In its broader aspects, however, this invention is applicable to any fluid, either gaseous or liquid including supercritical fluids.

Purified hydrogen has long been and continues to be used in a variety of industrial processes. For example, petroleum refineries are using increasing quantities of hydrogen to meet regulatory requirements on diesel, gasoline, and other petroleum products. Hydrogen-based treating processes are expected to grow substantially because fuel regulations in North America, Europe, and other regions are becoming increasing stringent. For example, the sulfur levels in U.S. diesel fuels must decrease from the current level of 250 ppm to 15 ppm by 2007. While several options exist for lowering sulfur levels, all of commercially available processes require a hydrogen input stream.

Another major use of hydrogen is in upgrading crude oil to make gasoline. To meet the world's increasing demand for gasoline, it has been necessary to develop poorer grades of crude oil that are denser and require hydrogenation for upgrading to gasoline.

Additionally, for more than 10 years there have been intense research and development efforts directed toward hydrogen as a clean power source for fuel cells. Compared to conventional power systems, hydrogen-powered fuel cells are more energy efficient, more robust, and less polluting. Fuel cells can totally eliminate ozone and nitrogen oxides, the most noxious precusors of smog. However, problems such as excessive cost, equipment size, and process complexity have prevented hydrogen-based fuel cell technology from replacing most conventional power sources.

The present invention provides apparatus and methods for separating fluids. The invention can be used, for example, to purify hydrogen formed in a steam-reforming reaction (typically a gas containing hydrogen, carbon monoxide and carbon dioxide). Compared to conventional fluid separation technology, many of the configurations and procedures of this invention are relatively simple, scaleable over a broad range, including small, and are amenable to cost-effective mass production.

SUMMARY OF THE INVENTION

In a first aspect, the invention provides a method of separating a fluid component from a fluid mixture including at least two steps. In the first step, a fluid mixture passes into a flow channel at a first temperature. The flow channel comprises a sorbent within the channel, and flow through the flow channel is constrained such that in at least one cross-sectional area of the channel, the height of the flow channel is 1 cm or less. Heat from the sorbent is transferred to a microchannel heat exchanger. The fluid mixture contacts the sorbent without passing through a contactor. Then, in a second step, energy is added and the temperature of the sorbent is increased. A fluid component is desorbed from the sorbent at a second temperature and a fluid component that was sorbed in the first step is obtained. The second temperature is higher than the first temperature.

In a second aspect, the invention provides another method of separating a fluid component from a fluid mixture that includes at least two steps. In a first step, a gas mixture passes into a flow channel at a first temperature. The flow channel comprises a sorbent within the channel, and flow through the channel is constrained such that in at least one cross-sectional area of the channel, the height of the flow channel is 1 cm or less. Then, in a second step, energy from an energy source is added and the temperature of the sorbent is increased. A fluid component is desorbed at a second temperature and a fluid component that was sorbed in the first step is obtained. The second temperature is higher than the first temperature. The first and second steps, combined, for a non-condensed fluid mixture (i.e., a gaseous or supercritical fluid) take 10 seconds or less and wherein at least 20% of the gaseous component sorbed in the first step is desorbed from the sorbent; or for a liquid mixture take 1000 seconds or less and wherein at least 20% of the fluid component sorbed in the first step is desorbed from the sorbent.

In a third aspect, the invention provides another method for separating a fluid component from a fluid mixture. In this method, a fluid mixture passes into a first sorption region at a first temperature and first pressure, wherein the first sorption region comprises a first sorbent and wherein the temperature and pressure in the first sorption region are selected to favor sorption of the fluid component into the first sorbent in the first sorption region. Heat from the first sorption region is transferred into a microchannel heat exchanger. A fluid component from said fluid mixture is selectively sorbed, thus resulting in a sorbed component in the first sorbent and a fluid mixture that is relatively depleted in said component. The relatively component-depleted fluid mixture is passed into a second sorption region at a second temperature and second pressure, wherein the second sorption region comprises a second sorbent and wherein the temperature and pressure in the second sorption region are selected to favor sorption of the fluid component into the sorbent in the second sorption region. Heat transfers from the second sorption region into a microchannel heat exchanger. The fluid component is selectively sorbed from said relatively component-depleted fluid mixture thus resulting in sorbed component in the second sorbent and a relatively more component-depleted gas mixture. The second temperature is different than the first temperature. Heat is added to the first sorbent, through a distance of about 1 cm or less to substantially the entire first sorbent, to raise the first sorbent to a third temperature and the component is desorbed from the first sorbent. Heat is added to the second sorbent, through a distance of about 1 cm or less to substantially the entire second sorbent, to raise the second sorbent to a fourth temperature and the component is desorbed from the second sorbent; and the component desorbed from the first and second sorbents is obtained.

In a fourth aspect, the invention provides a fluid separation apparatus that includes: a flow channel comprising a porous sorbent, the flow channel having at least one dimension of 1 cm or less, wherein, in at least one cross-section of the flow channel the porous sorbent occupies at least 90% of the cross-sectional area; and a microchannel heat exchanger in thermal contact with the flow channel. The invention also provides a use of this apparatus to purify a fluid component from a fluid mixture.

In a fifth aspect, the invention provides a fluid separation apparatus including: a first array of flow channels, a second array of flow channels, at least one fluid conduit connecting the outlet of the first array to the inlet of the second array; and a valve capable of controlling the flow through the fluid conduit. The first array of flow channels includes: at least two flow channels, each of which includes an inlet, an outlet and a sorbent disposed between the inlet and the outlet. Each of the at least two flow channels are in thermal contact with a microchannel heat exchanger and have at least one dimension of 1 cm or less. This dimension is in a direction toward a microchannel heat exchanger. The first array also includes at least one array inlet and at least one array outlet. The second array of flow channels includes: at least two flow channels, each of which includes an inlet, an outlet and a sorbent disposed between the inlet and the outlet. Each of the at least two flow channels are in thermal contact with a microchannel heat exchanger and have at least one dimension of 1 cm or less. This dimension is in a direction toward a microchannel heat exchanger. The second array also includes at least one array inlet and at least one array outlet. The invention also includes a method of using this apparatus in which a fluid component is sorbed in the first array, and, simultaneously, a fluid component in the second array is desorbed.

The low pressure changes involved in the temperature swing sorption (TSS) process of the invention allow very thin metal shim and foil construction, hence, allowing very low metal mass and therefore very fast cycle times. Thin-walled construction also allows high surface area per volume of TSS device, thereby producing high rates of productivity per unit volume of equipment, thereby providing a high productivity rate needed for industrial scale processing. Also, an important facet of the invention is that the high surface area per unit volume (SA/V) feature of the hardware allows the sorbent to be deposited within the device in a high surface area, thin film fashion. Hence, the sorbed species, once formed on the surface of the sorbent, does not need to migrate far to fully load the sorbent internal solid volume, which, in comparison, would be a slow process in thick sorbent beds containing coarse particles to reduce pressure drop across the bed. A benefit to the inventive TSS design is that, since only very thin sorbent layers are needed, and can be cycled rapidly, sorbent material normally considered too costly, such as Pd, can be used.

Numerous advantages are provided by various embodiments of the present invention including: reduced cost, reduced volume of separation hardware, durability, stability, separation speed, ability to separate large volumes of fluid components with a small volume of equipment, improved energy efficiency and reduced cost relative to packed bed or membrane technology.

The invention includes apparatus having any of the configurations indicated in the figures. However, these specific configurations are not the only means to carry out the invention and, therefore, should not be interpreted as limiting the inventive apparatus or methods. The invention also includes methods in which a fluid mixture passes through any of the illustrated apparatus. For example, with reference to FIG. 5a, the invention includes a method in which a fluid mixture flows through a flow distribution sheet and the distributed flow passes into a sorbent-containing compartment.

GLOSSARY

"Hardware volume" means the external volume of the separator apparatus including the sum of all parts if the apparatus is not integrated in a single unit.

"Internal surface" refers to any surface in the interior of the flow channel that is exposed to flowing fluid. Internal surface may be measured by appropriate techniques such as optical measurement or $N_2$ adsorption.

"Sorption/desorption" refers to the total amount of gas taken in without regard to the mechanism by which the fluid is taken in. In other words, "sorption" is the sum of adsorption and absorption.

The term "fluid mixture" means a fluid mixture containing between 1 and 999,999 parts per million (ppm) of a first component and at least one ppm of a component other than the first component.

The term "component" refers to a molecular species. It should be understood that any of the methods described herein could separate (for example, sorb) more than one component; but the sorption step selectively partitions components, that is, a sorption step either increases or decreases the relative amount of a selected component in the gas mixture.

Occasionally, the specification uses the term "solute." This term means component. The term "solute" does not require that component to be present in less than 50% by volume or mass.

The term "hydrogen" as it is used throughout the specification includes hydrogen and all its isotopes.

The term "obtaining" means that the component is recovered either for storage or for use in a subsequent chemical process such as combustion, fuel cell operation, chemical synthesis, etc. The term "obtaining" does not mean, however, that the component is used simply as a refrigerant.

The term "heat exchanger" means a component, or combination of components, that is capable of adding and removing heat. Preferred examples of heat exchangers include microchannels that can be switched from hot to cold fluids, electrical resistors in combination with a heat sink, and thermoelectric materials.

"TSA" is thermal swing adsorption.

A "porous contactor" is a porous or perforated material through which flow occurs to reach a sorbent.

BRIEF DESCRIPTION OF THE DRAWINGS

FIGS. 9a–9c schematically illustrate a 3-stage sorption process.

THEORY OF THERMAL SWING SORPTION IN MICROCHEMICAL SYSTEMS

Figure 1:
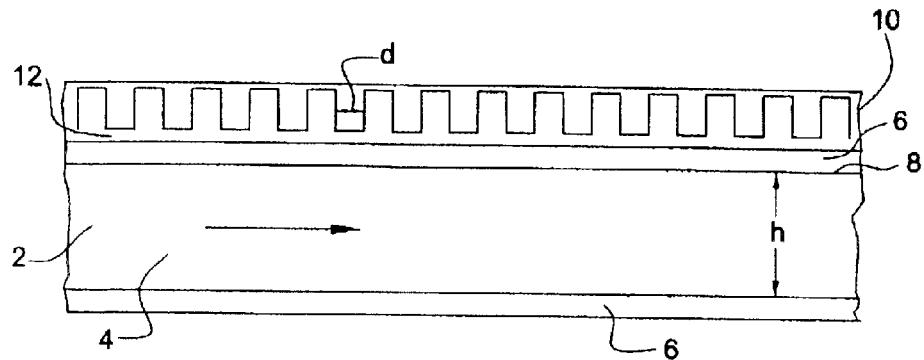
FIG. 1 is a schematic cross-sectional representation of a flow channel and heat exchanger.

The use of a microchannel architecture has distinct advantages for sorption based separation and purification processes. In particular for thermal swing based sorption, the ability to rapidly heat and cool systems enables more effective use of the sorbent bed. In addition, the form of an engineered sorbent can reduce mass transfer resistance.

Mass Transfer Time Comparison

For unsteady-state mass transfer, the time for a solute to diffuse through a porous matrix is defined in (1).

$$\tau = \frac{x^2}{D_e} \quad (1)$$

Where $\tau$ equals the time required to diffuse a distance x, and x is the distance over which diffusion occurs, and $D_e$ is the effective diffusivity for a solute in solution within a porous matrix. The effective diffusivity is defined as the molecular diffusivity ($D_a$) divided by a tortuosity factor for a specific porous geometry. For pores that are roughly straight, the tortuosity factor approaches unity. For pores that are non-straight and meander through a solid matrix, the tortuosity factor may be on the order of 10.

The value of the molecular diffusivity varies as a function of both the solute and the solution at varying temperatures and pressures. Typical values of molecular diffusivities ($D_a$) for gas phase solutes in a gaseous solution range from 0.1 to 0.01 cm²/s. Typical values for molecular diffusivities ($D_a$) for liquid phase solutes in a liquid phase solution range from $10^{-4}$ to $10^{-5}$ cm²/s. The tortuosity factor varies greatly as a function of the tortuous nature of pores within porous pellets or substrates. For the purposes of comparing microchannel systems with conventional, a common tortuosity value is selected of 3.

For a cylindrical or spherical pellet, the diffusion distance x, is half the pellet diameter ($d_{pellet}$). A typical dimension for a pellet used in a conventional sorption system is on the order of 1 cm. The typical time required for gas phase diffusion of the solutes within the porous pellet is defined by (2-3).

$$\tau_{pellet} = \frac{x^2}{D_e} = \frac{\frac{d_{pellet}^2}{4}}{\frac{0.1 - 0.01 \text{ cm}^2/s}{3}} \sim 7.5 \text{ to } 75 \text{ seconds for a} \quad (2)$$

gas phase solution $$\tau_{pellet} = \frac{x^2}{D_e} = \frac{\frac{d_{pellet}^2}{4}}{\frac{10^{-4} - 10^{-5} \text{ cm}^2/s}{3}} \sim 7500 \text{ to } 75000 \quad (3)$$

seconds for a liquid phase solution

Because the time for diffusion varies as a function of the square of the distance, decreasing the diffusion distance plays a disproportionate role in reducing the time required for diffusion. In conventional sorption technology, smaller pellets may be used, but at the expense of the overall system pressure drop. Bulk flow travels through the interstices between the randomly packed pellets. As the size of the pellet is reduced, the size of the interstices is also reduced, thus giving a greater net pressure drop for an equal size bed length.

The diffusion path length for a microchemical based sorption system is considerably smaller than conventional technology. The maximum thickness or diffusion distance for an engineered sorbent in a microchannel is about 2 mm. Preferably, the thickness of the engineered sorbent (for example a sorbent coated on a metal foam) is closer to 0.25 mm. The actual thickness of an engineered sorbent can be set through an optimization of opposing variables. Thicker engineered sorbents will have more sorbent volume (active sites for sorption) and thus a higher capacity. However, thicker engineered sorbents will also have a longer mass transfer and heat transfer time. The characteristic time for mass transfer in a microchannel based engineered sorbent is defined in (4-5).

$$\tau_{eng-sorbent} = \frac{x^2}{D_e} = \frac{0.025^2 \text{ cm}^2}{\frac{0.1 - 0.01 \text{ cm}^2/s}{3}} \sim 0.02 \text{ to } 0.2 \text{ seconds} \quad (4)$$

for a gas phase solution $$\tau_{eng-sorbent} = \frac{x^2}{D_e} = \frac{0.025^2 \text{ cm}^2}{\frac{10^{-4} - 10^{-5} \text{ cm}^2/\text{s}}{3}} \sim 20 \text{ to } 200 \text{ seconds} \quad (5)$$

for a liquid phase solution

The mass transfer time for a sorbate in an engineered sorbent housed within a microchannel is on the order of 100 to 1000 times shorter than in a conventional sorbent pellet for both gaseous and liquid phase separations. The actual values for mass transfer times will vary with the actual values of molecular diffusivities, tortuosity factors, and actual distance for mass transfer within a pellet or engineered sorbate.

Heat Transfer Time Comparison

The characteristic time for heat transfer may be a function of either conduction through the medium that separates the heat transfer fluid and through the sorbent, or the time may be a function of the time required for convection heat transfer to occur between the heat transfer fluid and the separating medium or wall.

For the case of convection-limited heat transfer, the lumped parameter method is appropriate for predicting characteristic times for heat transfer. This method is appropriate when the Biot (Bi) number is less than 0.1. The Biot number is defined by (6).

$$Bi = \frac{h\left(\frac{V}{A}\right)}{k} \quad (6)$$

Where h equals the convective heat transfer coefficient, V equals the volume through which heat transfer is occurring, A is defined by the surface area in the plane of and normal to heat transfer, and k is the thermal conductivity of the material.

The value of the convective heat transfer coefficient (h) in a microchannel as empirically measured for a gaseous heat transfer fluid typically varies from 200 to 2000 W/m²-K. The value for a liquid heat transfer fluid in a microchannel typically range from 10,000 to 30,000 W/m²-K. Values for convective heat transfer coefficients in conventional sized heat exchange systems are typically at least one order of magnitude smaller for both gaseous and liquid heat transfer fluids respectively.

The value for the thermal conductivity (k) is well defined for most metals, and can be measured for the porous sorbents. For the purposes of comparing a microchannel based system to a conventional sorption system, typical values are selected for, k. Assuming aluminum as a material of construction, the thermal conductivity of the metal is roughly 220 W/m-K. An aluminum foam is selected as a typical engineered sorbent substrate, and an estimated effective thermal conductivity is defined as roughly 10 W/m-K. Ceramic-based pellets used as substrates in conventional sorbent systems will have a slightly lower effective thermal conductivity that is closer to 2 W/m-K.

The value for V/A in a microchannel-based system is easily calculated based on the typical rectilinear geometry where V equals Height×Length×Width and A equals Height×Length. The resulting value of V/A is reduced to the Width, which is the critical thickness through which heat must be transferred to and from the heat exchanger and sorbent.

For a cylindrical tube that is typical for housing a conventional fixed bed of sorbent pellets, the value of V/A is reduced to the tube diameter divided by 4. The volume is defined as π×diameter squared/4×Length. The area A for heat transfer is π×tube diameter×Length.

The resulting Biot number calculations for a gaseous heat transfer fluid are shown in equations (7–9).

Microchannel System (h is in units of W/m²/K, k is in units of W/m/K, V/A is in units of m and both typical web and engineered (i e., porous) sorbent assumed to have a thickness of 0.25 mm)

$$Bi_{web} = \frac{h\left(\frac{V}{A}\right)}{k} = \frac{1000(0.00025)}{220} = 0.0011 \quad (7)$$

$$Bi_{eng-sorbent} = \frac{h\left(\frac{V}{A}\right)}{k} = \frac{1000(0.00025)}{10} = 0.025 \quad (8)$$

Conventional System (same units for h, k, and V/A, and typical bed diameter is at least 10 cm)

$$Bi_{conventional} = \frac{h\left(\frac{V}{A}\right)}{k} = \frac{100(0.025)}{2} = 1.25 \quad (9)$$

Thus for the case of a gaseous heat transfer fluid, the characteristic time for heat transfer in a microchannel system is dominated by convection resistance and for a conventional sorption system, the characteristic heat transfer time is dominated by conduction resistance.

When a liquid is used as the heat transfer fluid, the convective heat transfer coefficient is raised by roughly an order of magnitude. In this regime, the Biot number for heat transfer through the engineered sorbent exceeds 0.1, and thus the characteristic time for heat transfer in a microchannel-based sorption device is dominated by conduction resistance rather than convection resistance. For conventional systems, the Biot number will only get larger and the dominating heat transfer resistance remains conduction.

For the lumped parameter analysis, the characteristic time for heat transfer is defined by equations ($10^{-13}$). In these equations, T is the actual temperature as a function of time, $T_{ss}$ is the steady state temperature, and T0 is the starting temperature at time equal to 0, or at the start of a cycle.

$$\frac{T - T_{ss}}{T0 - T_{ss}} = \exp(-Bi * Fo) \quad (10)$$

$$Fo = \frac{\alpha t}{\left(\frac{V}{A}\right)^2} \quad (11)$$

$$\alpha = \frac{k}{\rho C_p} \quad (12)$$

Rearranging for the characteristic heat transfer time, t is defined in equation 13.

$$t = \frac{\left(\frac{V}{A}\right)^2 \left(-\ln\left(\frac{T - T_{ss}}{T0 - T_{ss}}\right)\right)}{\alpha Bi} \quad (13)$$

The value of α for an aluminum web at ambient conditions is roughly 9×10⁻⁵ m²/s. The value of α for an aluminum foam is roughly 4×10⁻⁵ m²/s.

Solving for the time required for the temperature within the wall to reach 95% of the temperature of the heat transfer fluid is shown in equation (14).

$$t = \frac{(0.00025 \text{ m})^2(-\ln(0.05))}{9 \times 10^{-5} \frac{m^2}{s} 0.0011} = 1.9 \text{ sec} \quad (14)$$

Solving for the time required within the engineered sorbent to reach 95% of the temperature of the heat transfer fluid is shown in equation (15).

$$t = \frac{(0.00025 \text{ m})^2(-\ln(0.05))}{4 \times 10^{-5} \frac{m^2}{s} 0.025} = 0.19 \text{ sec} \quad (15)$$

The total time for the temperature within the engineered sorbent to reach 95% of the initial temperature of the heat transfer fluid is about 2 sec.

If the temperature of the heat transfer fluid is maintained at a much higher temperature than the desired sorption or desorption temperature, then the characteristic time for heat transfer will be considerably shorter. As an example, if only 10% of steady-state is desired, then the characteristic times for heat transfer will be reduced by a factor of 28. An example calculation is shown in equation (16).

$$t = \frac{(0.00025m)^2(-\ln(.9))}{9 \times 10^{-5} \frac{m^2}{s} 0.0011} = 0.07 \text{ sec} \quad (16)$$

The additional time for heat transfer through the engineered sorbent will be 0.007 sec. The characteristic time for heat transfer in the conduction-resistance dominated regime is defined by equation (17).

$$t = \text{factor} \frac{x^2}{\alpha} \quad (17)$$

The factor is determined from empirical heat transfer curves and defined for different geometric shapes. For a cylinder of infinite length (e.g., length much longer than diameter) and a desired temperature approach of 95% of steady-state, the factor equals 0.6.

For a packed bed of ceramic sorption pellets, the value of α is approximately $1.3 \times 10^{-6}$ m²/s. Solving for the characteristic heat transfer time for a conventional sorption bed is defined by equation (18).

$$t = 0.6 \frac{0.05^2 m^2}{1.3 \times 10^{-6} \frac{m^2}{s}} = 1150 \text{ sec} \quad (18)$$

If an approach of 95% of steady-state is not required and the device is operated to only within 10% of steady-state, then the characteristic time is defined by equation (19).

$$t = 0.1 \frac{0.05^2 m^2}{1.3 \times 10^{-6} \frac{m^2}{s}} = 192 \text{ sec} \quad (19)$$

For the microchannel-based sorption system that is dominated by conduction resistance not convection resistance (e.g., a liquid heat transfer fluid not a gaseous heat transfer fluid), then the characteristic time for heat transfer is defined by equation (20) when a 95% approach to equilibrium is desired. If a less restrictive approach to equilibrium is required, then the characteristic time for heat transfer will be even shorter.

$$t = 1.3 \frac{0.00025^2 m^2}{4 \times 10^{-5} \frac{m^2}{s}} = 0.002 \text{ sec} \quad (20)$$

Comparison between microchannel-based sorption device and conventional sorption hardware The characteristic time for heat transfer in a microchannel-based sorption device is typically 100 to more than 1000 times shorter than a conventional packed bed sorption device when either a liquid or a gaseous heat transfer fluid is used in the microchannel device.

The characteristic times for heat and mass transport drive the required cycle time for the requisite multi-stage separation device, however they are not equivalent to the cycle time.

Cycle Times

Cycle times can be estimated for a gas and liquid separations. For the case of a liquid heat transfer fluid, the time required for mass transfer time may dominate the cycle time. For a gaseous phase separation the characteristic mass transfer time is 0.02 to 0.2 sec. However, this is equivalent to the time for a theoretical plate to equilibrate in a multi-stage equilibrium stage separation model. A cycle may have, for example, 5 to 10 or more theoretical stages. In addition, time for the mixture to move through dead zones of the device must be included within the cycle time calculation. Therefore, the cycle time for a 5 to 10 stage microchannel-based sorption device for a gas-phase separation may be as low as roughly 0.1 to 1 second. The actual value will depend upon a multitude of variables, including the efficiency of the design to reduce dead volume.

For a liquid-phase separation, the required time for mass transfer will always dominate the cycle time in a microchannel device. The characteristic mass transfer time is roughly 20 to 200 seconds in a microchannel device. It is anticipated that the minimum 5 to 10 stage cycle time will be about 100 to 1000 seconds.

Shorter cycle times to achieve the same degree of separation in a microchannel-based sorption device will lead to much smaller bed volumes and thus likely much lower hardware cost. Additional columns and purge streams for heating and cooling are not required in microchannel devices. Conventional TSA processes often mitigate the long characteristic times for conductive heat transfer through the bed volume by introducing a separate purge stream for the purpose of heating or cooling a bed through convective heat transfer prior to a sorption or desorption cycle. This addition of extra streams will thus introduce sorbent bed inefficiencies and added cost by not fully utilizing the sorbent bed at all times for either sorption or desorption.

DESCRIPTION OF THE PREFERRED EMBODIMENT(S)

FIG. 1 illustrates one example of a flow channel 2 including open channel 4 and sorbent 6. The direction of net gas flow through the channel is indicated by the arrow. Flowing gas contacts the sorbent 6 at internal surface 8. For at least part of the flow channel, the distance from any point in the open channel (as measured in a plane perpendicular to flow) to the internal surface is 10 mm or less, preferably 0.1 mm or less. Utilizing a thermal swing sorption device in which flowing hydrogen is in close proximity to the sorbent minimizes the distance and time for mass transport.

In preferred embodiments, the open channel has: a height h of less than 1 cm, more preferably less than 2 mm, and in some embodiments 0.5 to 2 mm. The width and length may be of any value. However, these parameters have design considerations that lead to optimal designs. Longer lengths will create more active sites for sorption during any given cycle, but at the expense of a higher pressure drop. Increasing the width of the sorbent zone will also create more active sites for sorption. However, this might lead to flow maldistribution issues if the width is too large. The length and width can be optimized in view of the fluid properties and the accessible header size relative to the channel size. In some preferred embodiments, width (perpendicular to height and flow) is 0.01 cm to 300 cm, more preferably 2 cm to 25 cm; and length is 0.01 cm to 300 cm, more preferably 2 cm to 25 cm.

The open channels can be disposed in a chamber that is on top or below an array of heat exchanger microchannels. In an alternative arrangement (not shown), the open channels can be disposed in an interleaved fashion between (i.e., alternating with coplanar) adjacent channels of heat exchanger channels. In some embodiments, at least 3 layers with flow channels alternate with at least 4 layers with heat exchangers 10. The flow channel can be any shape but is preferably straight with an unobstructed open channel.

For hydrogen sorption, the internal surface 8 is preferably a Pd alloy or metallic Pd. It has been found that Pd can sorb and desorb hydrogen at surprisingly fast rates, leading to reduced cycle times. Pd is also a good thermal conductor. Unlike in catalysts, the surface palladium is not dispersed on an oxide surface, and is preferably a continuous layer. At low temperature, hydrogen is rapidly sorbed through surface 8 into sorbent 6. In some preferred embodiments, the sorbent 6 is the same material as the surface 8. In other embodiments, the sorbent 6 includes another material that reversibly sorbs hydrogen. For example, the hydrogen sorbent can contain any of the metal hydride forming elements (see, Greenwood et al., Chemistry of the Elements (1984)). Preferred sorbent materials include Pd, Pd alloy, Ti, V, LaNi$_5$, Al doped nickel lanthanides, and Ni. Because of the excellent selectivity of Pd or Pd alloys for hydrogen on the surface 8, the underlying sorbent 6 need not be selective for hydrogen. For example, a hydride forming sorbent sublayer having a thickness of 10 nm to 1 mm may be coated with a thin Pd surface-exposed sublayer having a thickness of less than 0.025 mm, more preferably about 0.0001 to 0.02 mm. Preferably at least 80%, more preferably at least 90%, of the exposed surface (i.e., the surface exposed to the hydrogen-containing gas in the flow channel) of the sorbent is coated with Pd or a Pd alloy. For some applications, in which excellent selectivity is not required, the sorbent need not have a Pd surface. The thickness of the sorbent layer may be selected based on the volume of sorbent required to sorb a given quantity of hydrogen.

In preferred embodiments, the hydrogen sorbent is a thin layer. Conventional hydrogen sorbents crumble as a result of cycling, thus degrading thermal transport characteristics and degrading device stability. In the present invention, the sorbent layer can be kept thin so that the expansion and contraction of the sorbent/hydride layer does not result in crumbling. Instead, while cracks may form, due to its thinness, the sorbent layer maintains excellent adhesion to the underlying channel or heat exchanger wall. Since the height of flow channels can be made quite small, and the device cycled at high rates, multiple flow channels containing thin sorbent layers can be used in concert to separate significant quantities of hydrogen. In preferred embodiments, the sorbent 6 including surface 8 has a thickness of 0.0001 to 1 mm, more preferably, 0.004 to 0.1 mm. In some preferred embodiments, the sorbent is a dense (nonporous) thin layer, thus maximizing sorbtion capacity as a function of volume.

For maximum use of space, in preferred embodiments, at least 80% of the internal surface of the flow channel is coated with Pd or a Pd alloy. After cycling, small amounts of residual hydrogen may remain in the sorbent. Other preferred sorbents include palladium alloys such as a palladium silver alloy. The palladium alloys can enhance durability of the device due to their greater resistance to crumbling over multiple cycles. Preferably, the sorbent material undergoes a phase transition during sorption to enhance the sorption rates and/or capacity.

The sorbent (for sorbing hydrogen or any other component) may contain a promoter or an intermetallic that improves dissociation kinetics thus decreasing sorption time, and reducing overall cycle time. For example, Ru particles on the surface of Pd may increase the rate of sorption and desorption. In general, the addition of a secondary (or tertiary) material (often times in very small quantities) to a primary material can influence the net rate of hydrogen (or other gaseous species) adsorption onto the surface of the primary material in a heterogeneous system. By affecting the kinetics of the adsorption process and the surface composition, the added material can also increase the ultimate adsorptive capacity (or apparent capacity) of the primary material surface. The first effect, increasing the rate of sorption (purely a kinetic phenomena), is a two-fold result of the chemical nature of the added material and how this chemical nature interacts with the primary material to result in physically-segregated surface structure, which, in turn, can affect the ultimate adsorptive capacity (or apparent capacity).

Ru at defect-like sites adsorb (and subsequently dissociate) hydrogen at a faster rate than Ru atoms lying away from edges or corners, in "basal planes". Thus, the observed (or "apparent") kinetics of hydrogen adsorption on Ru (and many other materials) really represents the superposition of the different kinetics of different Ru sites. This phenomenon can be applied to have the opposite effect: adding an element like Ru to a system that does not adsorb hydrogen as easily/quickly results in faster apparent adsorption kinetics.

The explanation of second effect (the apparent alteration of the ultimate adsorptive capacity of a material) is a bit more complicated, but it is basically an extension of the same concept. Since altering kinetics cannot change the equilibrium of a system, it seems like this concept violates thermodynamics. In reality, though, the observed effect is really due to deconvolution of superimposed effects: different phases of a material have different adsorption stoichiometries (i.e. one packing arrangement (call this arrangement 111) of surface metal atoms (M) may adsorb a gas (A) in a ratio of M(111):A=1:1, while another arrangement (call it 110) (which is present in the same material in a certain proportion) adsorbs more, M(110):A=1:2. Adding a second material (N), which selectively occupies (111) sites and also adsorbs more A, N(111):A=1:2, results in more net adsorption of the gas, A. If N also adsorbs A faster than M, then the first effect and the second effect compliment each other.

In general, the sorbent is selected for sorption of the desired component. The sorbent can be disposed as dense or porous sorbent layers on the flow channel walls. The sorbent can be directly coated on the flow channel walls. The sorbent could be a porous sorbent, preferably a monolith, inserted into a flow channel. The sorbent could also be disposed on a porous substrate, preferably a thermally-conductive felt or continuously porous foam. A relatively thin interfacial layer such as a ceramic could be interposed between a porous substrate and sorbent to improve adhesion and/or increase sorbent surface area. Alternatively, the porous substrate could be entirely formed from the sorbent material. In some embodiments, a porous sorbent could fill or substantially fill the open channel such that substantially all the gas flows through the porous sorbent (typically a sorbent-coated porous substrate).

A heat exchanger 10 is in thermal contact with the flow channel. Preferably, the heat exchanger is a microchannel heat exchanger meaning that the channel or channels have a height (the dimension described above) and/or a width d of less that about 2 mm. Flow of the heat exchange fluid in the heat exchanger can be cross-(illustrated), counter- or co-flow in relation to gas flow through the flow channel. Preferably, the heat exchanger is directly adjacent to the flow channel and more preferably the heat exchanger substantially overlaps the flow channel. In a particularly preferred embodiment, the heat exchanger and flow channel are adjacent and substantially coextensive thin layers with width and length substantially larger than height. Preferably the same wall 12 comprises the wall of both the heat exchanger and flow channel and in this embodiment, the wall is included in calculating height of the heat exchanger but not the flow channel. The heat exchanger contacts the flow channel through a thermally conductive material, such as steel, aluminum or plastic. The heat exchanger can utilize any suitable heat exchange fluid, with water and heat transfer liquids (such as Therminol™) being especially preferred, gases and vapors less so. In a particularly preferred embodiment, conditions for sorption and/or desorption are selected to coincide with a phase change of a heat transport fluid—for example, very high rates of heat transfer can be obtained by condensing and/or vaporizing stream.

In general, it is highly desirable to form a system with minimal thermal mass. Preferably, thermal swing sorption is conducted at low pressure (preferably about 1 to 1000 psig more preferably 1–300 psig) so that relatively thin walls can be used to contain the system. Low pressure operation can be further aided by operating sorption and desorption in stages with a relatively narrow temperature range that is optimized for a particular pressure range. In preferred embodiments, less structural support is provided in regions that will operate at relatively lower pressure.

Figure 2:
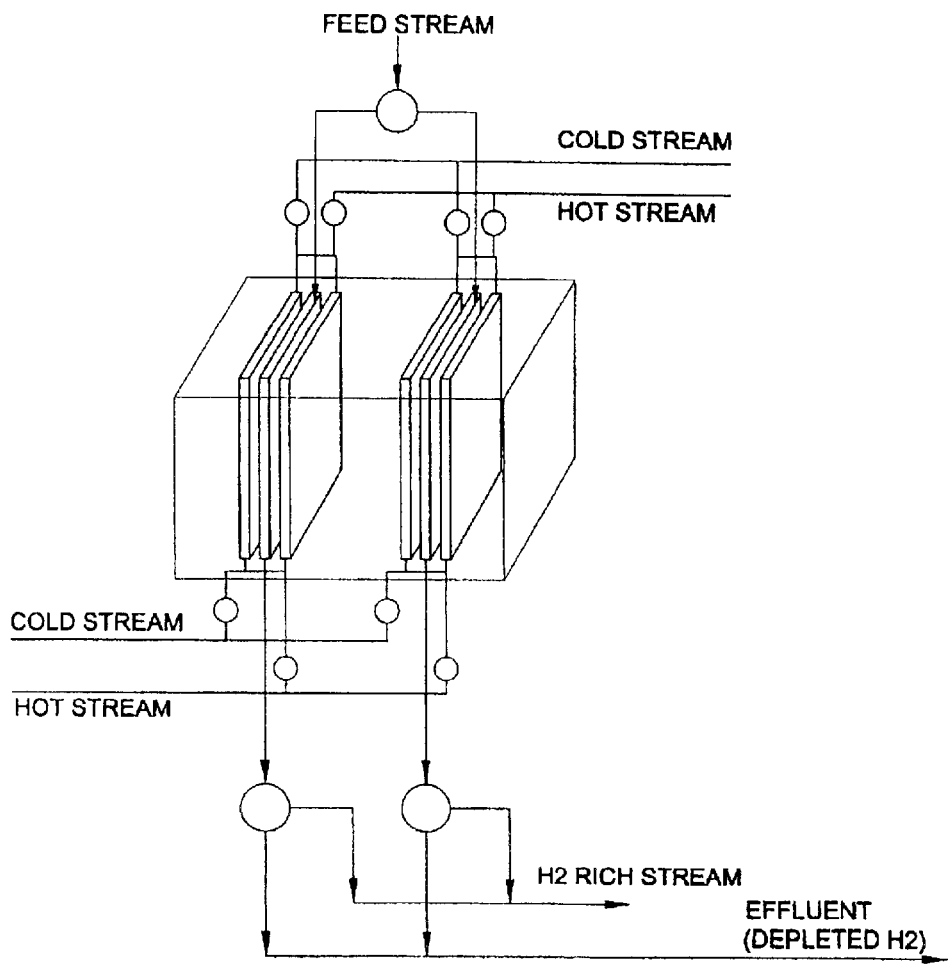
FIG. 2 is a schematic representation of fluid sorption apparatus including valves (darkened circles).

FIG. 2 schematically illustrates an embodiment of the invention in which a feed stream is distributed among multiple flow channels each of which is sandwiched between heat exchangers. Valves (indicated by darkened circles) control gas flow as well as heat exchange fluids.

Figure 3A:
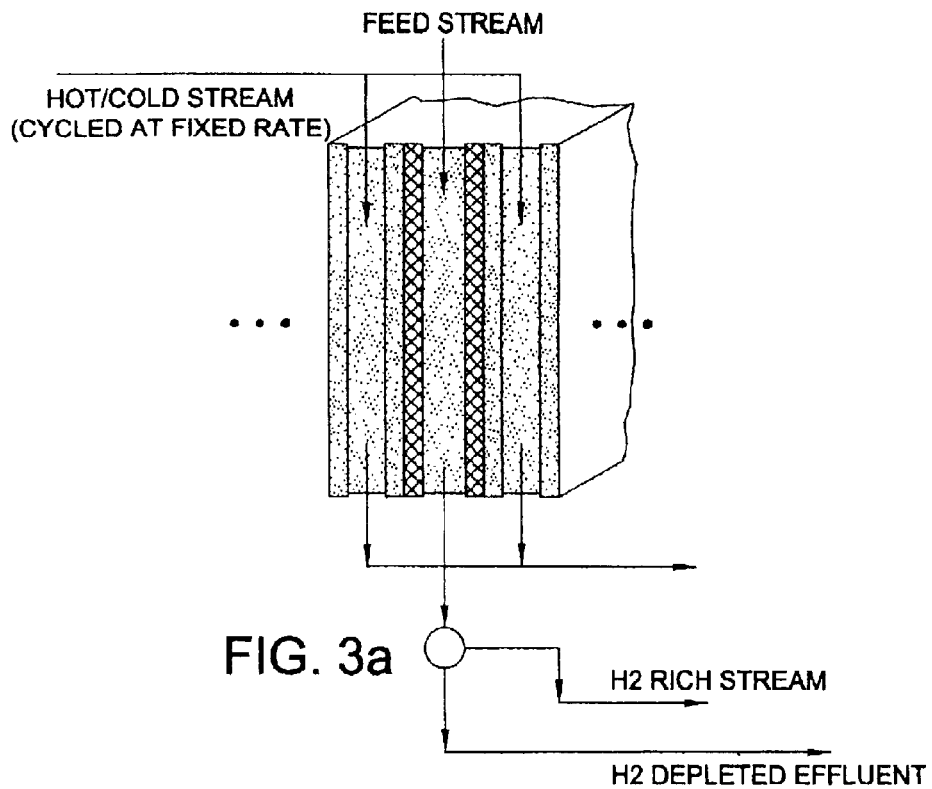
FIG. 3a is a schematic cross-sectional representation of a flow channel and heat exchanger. The sorbent is disposed on the flow channel walls.

FIG. 3a illustrates the case where a sorbent (cross-hatched) is disposed on the sides of an open channel. Hydrogen in the feed stream diffuses from the open channel into the walls where it is sorbed and thus separated from the feed stream. As indicated by the dots in FIG. 3a, the capacity of the device could be readily increased by stacking repeating layers of flow channels and heat exchangers.

Figure 3B:
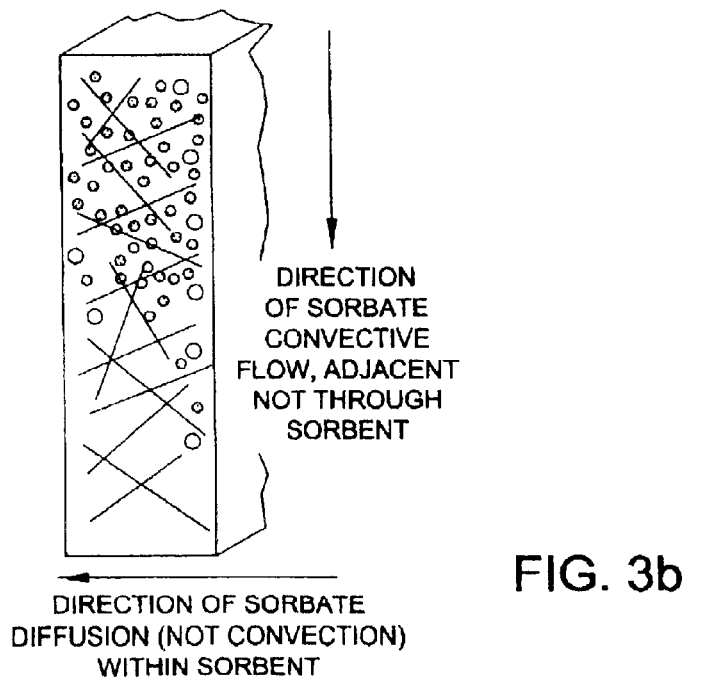
FIG. 3b is a schematic cross-sectional representation of a flow channel containing a porous sorbent and a flow path for convective flow adjacent to the sorbent.

FIG. 3b illustrates a separation process through apparatus such as that represented in FIG. 3a: A gas mixture containing weakly sorbed molecules (○) and strongly sorbed molecules (●) enters the flow channel. The shaded molecules indicate preferentially sorbed molecules with the lighter shaded circles representing molecules actually sorbed into or onto the sorbent. The pores are sufficiently large to enable fast molecular diffusion within the tortuous 3-D structure. Solutes then may diffuse either molecularly or through Knudsen diffusion within smaller pores found within the active sorbent coated on the engineered sorbent substrate. The size of the smaller pores is less than the size of the large pores. Preferably, the pores are in the micro to mesoporous range to enable a high surface area with many sites for rapid sorption. Sorption occurs at low temperature, and temperature is switched to high temperature before the preferentially sorbed molecules elute from the channel. The purified stream (○) is one of at least two product streams from this process. The process could be designed and operated for a multi-component separation, where a ternary or higher mixture is separated into components rather than just a binary separation. However, separating or purifying multiple streams will require additional stages. Preferably, the microchannel dimension is about 2 mm or less. The height and length may be of any value. The thickness for an engineered (i.e. porous) sorbent is preferably between 100 microns and 500 microns. More preferably, the thickness of the engineered sorbent is between 100 and 250 microns. Convective flow is essentially through a gap that is adjacent to the engineered sorbent. The solutes primarily diffuse through the gap to the engineered sorbent and then continue to diffuse through the engineered sorbent. The direction of diffusion through the engineered sorbent is primarily normal to the direction of convective flow.

Figure 4A:
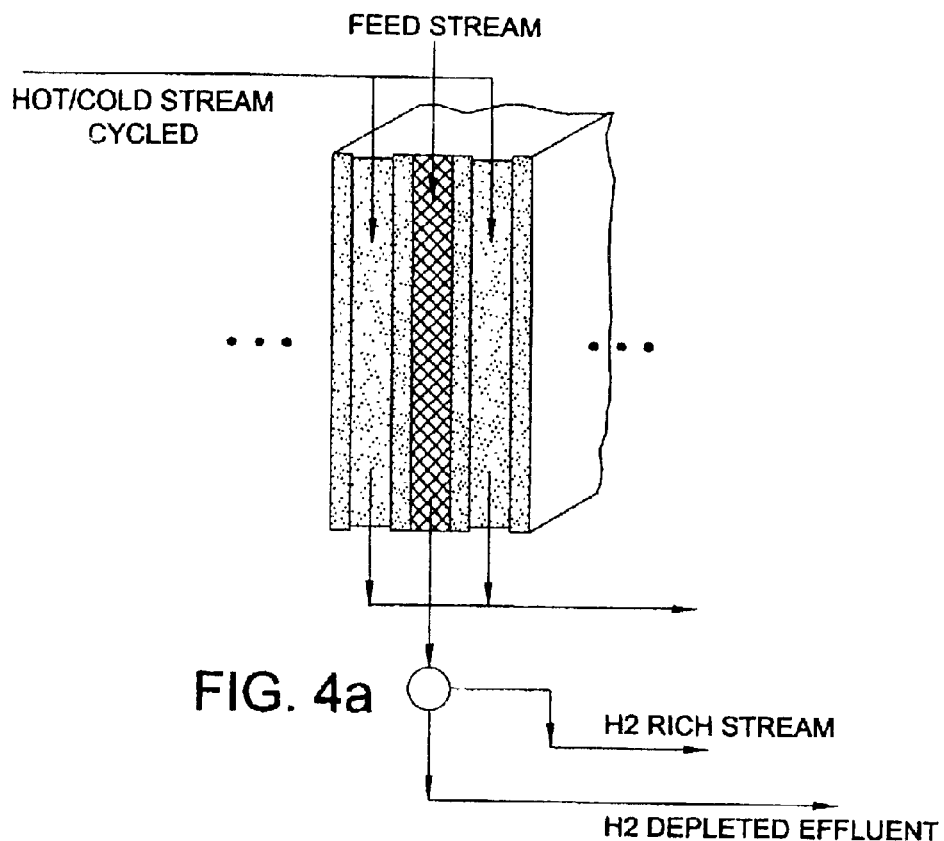
FIG. 4a is a schematic cross-sectional representation of a flow channel and heat exchanger.

FIG. 4a illustrates a configuration in which a porous sorbent (cross-hatched) fills the flow channel. Since the sorbent is porous, flow occurs through the sorbent; however, the pressure drop through the flow channel is generally higher than in the case of an open channel.

Figure 4B:
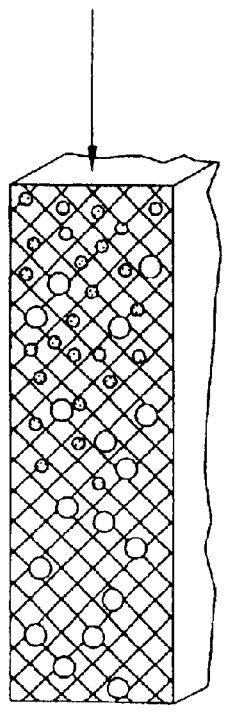
FIG. 4b is a schematic cross-sectional representation of a flow channel filled with a porous sorbent. The sorbent is disposed in the flow channel such that flow is substantially through the sorbent.

FIG. 4b illustrates an alternate embodiment for a porous sorbent within a microchannel-based sorption device. In this embodiment, flow is primarily directly through the sorbent. Diffusion distances for mass transfer within this embodiment may be shorter than in the flow by configuration shown in FIGS. 1–3. The mass transfer distance is essentially limited by the size of the large pores where convective flow occurs and the coating thickness of the active sorbent agent placed upon the surface of the engineered sorbent substrate. The size of these pores typically range from 10 to 500 microns. However, the reduction in mass transfer resistance will be offset by an increase in pressure drop. As flow is force through the tortuous network of open pores, the increase frictional losses will increase pressure drop. For applications that are not sensitive to maintaining a low-pressure drop, this approach may be preferred.

The "porous materials" (including "porous sorbent") described herein refer to porous materials having a pore volume of 5 to 98%, more preferably 30 to 95% of the total porous material's volume. At least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by Mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase sorption conditions. Preferred porous materials include foams and felts, where felts are collections of fibers or strands. More preferably a porous material is a unitary piece of material (also called a monolith) that is sized to fit within a flow channel and occupying a selected portion of the cross-sectional area of the flow channel.

Figure 5A:
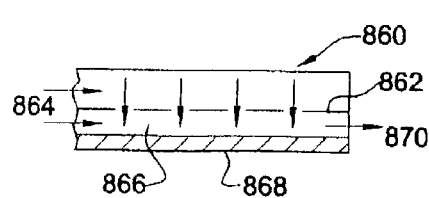
FIG. 5 illustrates cross-sectional schematic views of sorption chamber configurations including (a) a flow distribution sheet that distributes flow into a sorbent-containing compartment; (b) a bulk flow channel disposed between porous sorbent layers; (c) dual corrugated sorbent; (d) corrugated sorbent with gas flow over the sorbent surface; (e) corrugated sorbent with gas flow through the sorbent; (f) wires of sorbent material; (g) fibers; (h) baffles having coatings of porous sorbent material; (i) baffles composed of porous sorbent material; and (j) a porous matrix with bulk flow channels.

FIG. 5a illustrates apparatus 860 where a flow distribution layer 862 (typically a sheet having random, regular, or spaced pores, slots, holes, or the like) can distribute feed 864 along a length of the chamber 866 in a flow path 870. The chamber 866 preferably contains a sorbent material 868 (although illustrated as a single layer along the length of the chamber—thus enabling low pressure drop, it should be recognized that a sorbent material 868 could have any of the configurations described herein).

Figure 5B:
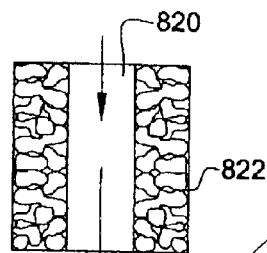

FIG. 5b illustrates an embodiment in which a bulk flow path 820 is disposed between porous sorbent material 822, although some flow may convectively travel through the large pores in the porous material. Flow through the large pores increases when the pore diameter of the porous insert increases and approaches an order of magnitude below the hydraulic diameter of the open area. This chamber could be configured as a tube, with a ring or partial ring of sorbent, but is more preferably a planar arrangement. The planar arrangement enables economical stacking of chambers with other components such as: additional chambers, heat exchangers, etc. The contiguous, straight-through configuration of the bulk flow channel creates the opportunity to perform gas phase separations with low pressure drops.

Figure 5C:
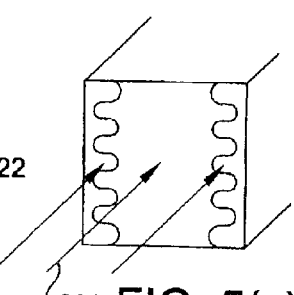
Figure 5D:
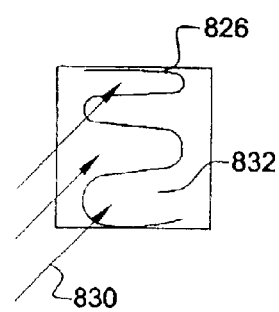
Figure 9A:
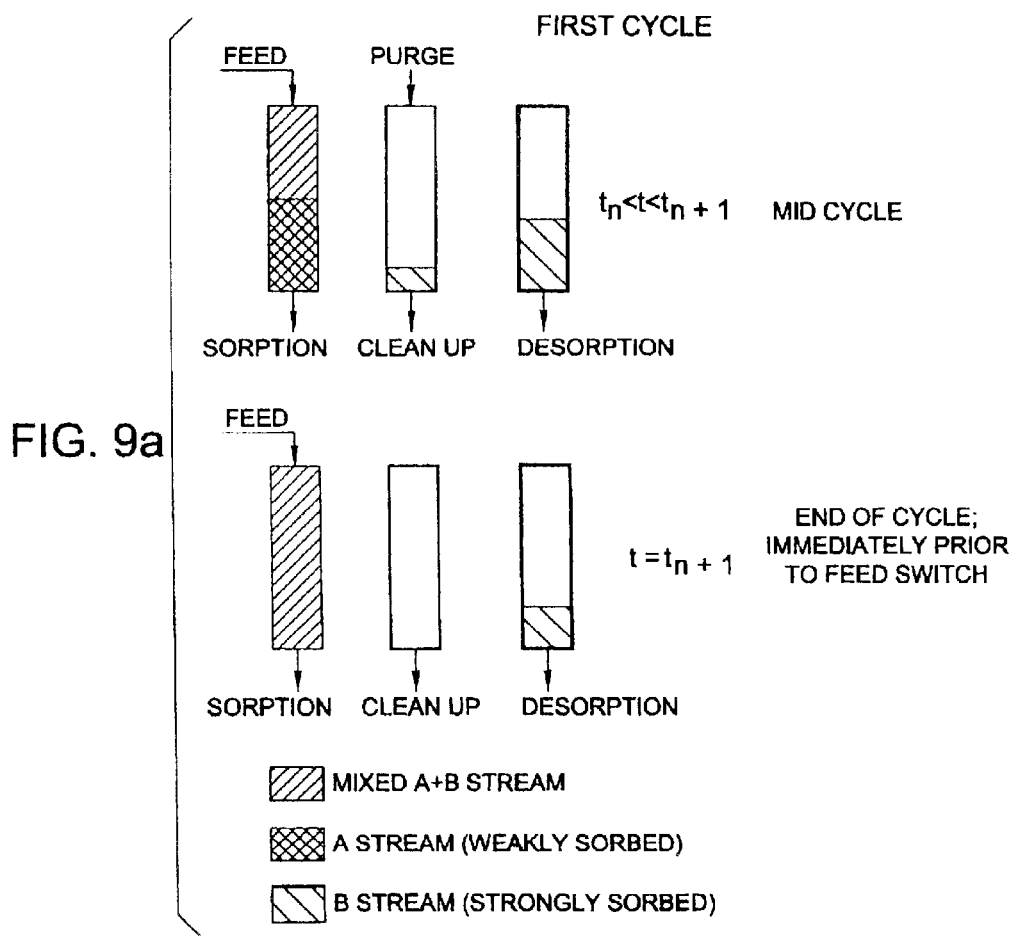

FIGS. 5c and 5d illustrate sorption chamber configurations in which corrugated inserts 826 provide high surface area for sorption while contiguous flow paths 828, 832 enable sorption to be performed with low pressure drops. The inserts 826 either have a surface coating of a porous sorbent material or, preferably, are comprised of a porous sorbent material. A similar configuration is illustrated in FIG. 9d.

Figure 5E:
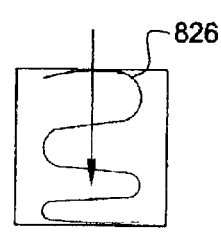

FIG. 5e illustrates an embodiment in which a corrugated porous sorbent material 826 is disposed in the sorption chamber such that gas flow is partially through, and around the sorbent. This configuration ensures contact with the porous sorbent; however, this configuration has the disadvantage of significantly higher pressure drops than with an open channel, but the advantage of more intimate contact of the gas with the sorbent surface.

Figure 5F:
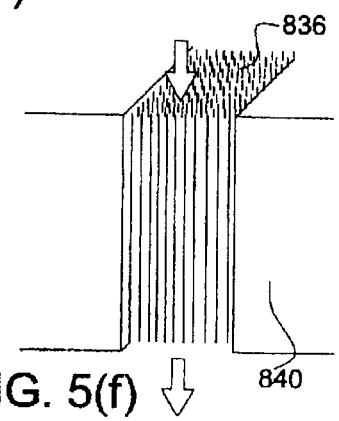
Figure 5G:
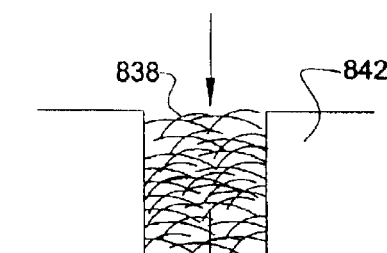

FIGS. 5f and 5g utilize sorbent fibers 836, 838. These fibers may, for example, be porous ceramic, metal or composite fibers. The parallel fibers 836 are preferred because they cause less of a pressure drop. The fibers 838 create tortuous flow through the chamber. In either case, sorbent fibers are preferred over powders because they cause less pressure drop, can have better thermal conductivity, and can provide a more uniform and controlled surface. The chamber walls 840, 842 can be ceramic, plastic, metal (for good thermal conductivity), or composites.

Figure 5H:
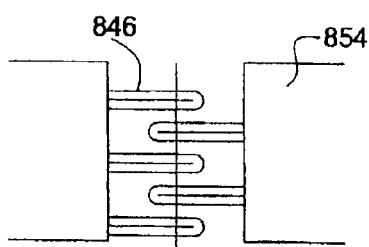
Figure 5I:
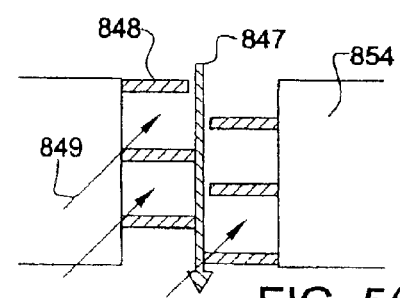

FIGS. 5h and 5i illustrate chambers with baffles 846, 848. Baffles 846 comprise plates or rods composed of a porous sorbent material or that are coated with a sorbent material. Baffles 848 comprise plates or rods composed of a porous sorbent material. Flow can either be parallel 849 or nonparallel 847 or differing solutes can flow in differing directions (e.g. orthogonal solute flows). In either case, there is a contiguous bulk flow through the chamber. These baffles can create turbulence and enhance contact of gaseous solutes with the sorbent. The baffles, which preferably comprise a thermally conductive metal, provide good heat transport to (or from) the walls. The chamber walls 854 may be of the same materials described above for walls 842.

Figure 5J:
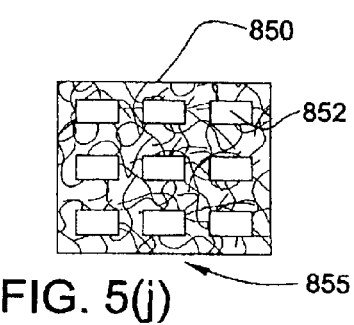

FIG. 5j illustrates a porous sorbent matrix material 850 within which there are contiguous bulk flow channels 852. The matrix 850 can be the chamber walls or the entire article 855 can be an insert that fits into an opening. Preferably the matrix material contains 1 to 10,000 more preferably 10 to 1000 bulk flow channels 852. In a preferred embodiment, the bulk flow channels 852 are essentially straight. In another embodiment, these channels are tortuous. In yet another embodiment, the channels 852 are filled with a sorbent material and bulk flow of solutes and solution is primarily through the matrix.

Figure 6A:
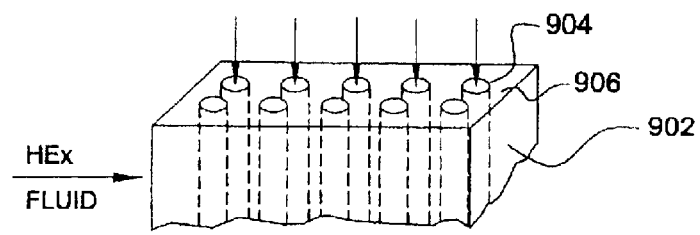
FIG. 6 illustrates schematic views of sorbent chamber configurations including (a) a perspective view of sorbent channels with cross flow of a heat exchange fluid; (b) a cross-sectional view of a porous sorbent material that does not directly contact the walls of the chamber; (c) top—a chamber with a porous plug, and bottom—multiple flow channels with a mixing chamber; (d) a u-shaped channel filled with porous sorbent material; (e) porous dividers; and (f) mixing streams that are directed to flow between layers of porous sorbent material.

FIG. 6a illustrates a sorption apparatus 902 with tubes/chambers 904, each of which may contain a porous sorbent material (not shown) in any of the configurations described herein. The gas mixture flows through the tubes. On the outside of these tubes is a bulk flow volume 906. In a preferred embodiment, a heat exchange fluid flows through the bulk flow volume; flow of the heat exchange fluid can be cross-flow, concurrent flow or counterflow to the flow of gaseous solutes and products.

Figure 6B:
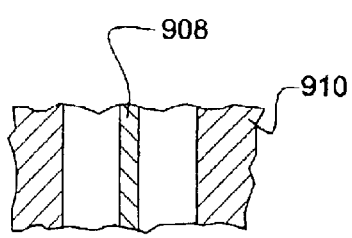

FIG. 6b illustrates a configuration in which a porous sorbent material 908 is disposed within the chamber without direct contact to the chamber walls 910. This embodiment may require longer cycle times to overcome the higher heat transfer resistance. In another embodiment (not shown), the material 908 comprises a core of a large pore structure (in which molecular diffusion occurs) and a small pore structure (through which Knudsen diffusion occurs) on the outer sides. Sorbent may be coated on the small pore structure, or on the large pore structure, or on both.

Figure 6C:
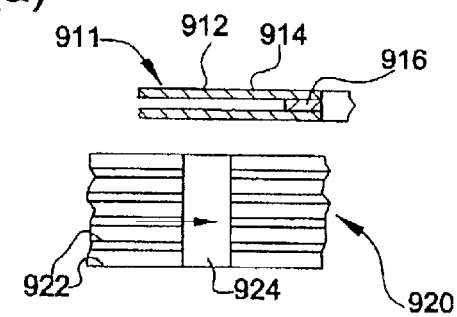

The top of FIG. 6c illustrates a chamber 911 having a bulk flow path 912 and porous sorbent material 914, 916. The porous plug 916 serves to provide sorbent contact to any gaseous species that remain unsorbed after passage through bulk flow path 912. The flow regime in this example, and in other figures, is typically laminar based upon the classical definition of the Reynolds number less than 2000. Although the flow regime may also be transitional or turbulent in the microchannels, this is less common. For laminar flow, there will be gas species that move along the centerline of the channel. Not all molecules may have an opportunity to diffuse to the porous sorbent. For those molecules that do not diffuse to the wall to sorb, this is referred to as 'slip'. The overall sorption may thus be a few percentage points lower than equilibrium would suggest attainable. The use of the porous sorbent material through the entire cross section for a fraction of the channel length serves to reduce slip and enable overall higher sorption capacity.

The bottom of FIG. 6c illustrates a sorption apparatus 920 comprised of multi sorption chambers 922 and a mixing chamber 924. The mixing chamber combines gases from at least two chambers 922. The mixing chamber helps to equalize concentration between multiple chambers by mixing the possibly laminar flow streamlines and helps to ensure a higher overall adsorption than if the at least two chambers were joined into one chamber by reducing the centerline slip of gases.

Figure 6D:
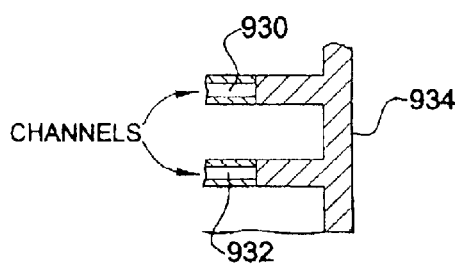

FIG. 6d illustrates a separator in which the bulk flow from at least two sorption chambers 930, 932 flow into porous material 934. In an alternative mode of operation, flow enters through flow path 930, through porous material 934 and out through flow path 932. This embodiment also serves to reduce the possible slip of fluids and bring the overall sorption closer to that predicted at equilibrium.

Figure 6E:
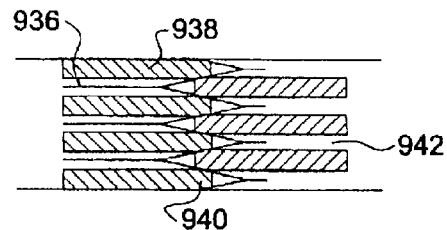

FIG. 6e illustrates a forked configuration in which a gas mixture enters a first compartment 936, having a dimension of about 2 mm or less, and convectively travels past porous sorption material 938 and then travels convectively through porous material 940. While traveling in compartment 936, the feed may diffuse to the porous sorbent. The gas exiting the porous material 940 flows into second compartments 942. The compartments 936 and 942 may or may not be offset. By offsetting porous dividers 938, the gas flows in adjacent first compartments are further mixed to reduce the slip of components.

Figure 6F:
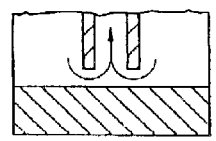

FIG. 6f illustrates a flow configuration where the feed flows along one side of a porous sorbent in the first flow path, makes at least one bend, and then travels back along the other side of the porous sorbent in the opposite flow direction to form at least one second flow path. In an alternate configuration, a second sorbent may be used for the second flow path. In another configuration, a wall may separate the porous sorbents used in the first and second flowpath.

Figure 7:
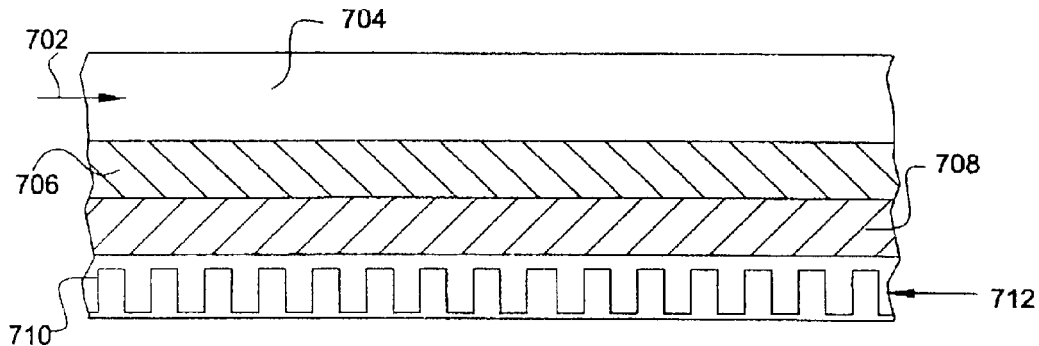
FIG. 7 is a schematic cross-sectional representation of a flow channel and heat exchanger.

Another preferred embodiment is illustrated in FIG. 7. In this embodiment, a fluid mixture feed stream 702 passes into open channel 704. During the cool phase of a cycle, a component is selectively sorbed in sorbent 706. To desorb, the feed stream is discontinued and heat is added from electrically resistive heating element 708. Electrical heating in restricted volume devices can rapidly increase temperature (100 C. per second or more, see, e.g. U.S. Pat. Nos. 6,174,049 and 4,849,774 incorporated herein by reference), thus enabling very short desorption phases. Heat from the electrical resistor 708 is then removed through microchannel cooler 710. In this configuration, the heat exchanger is formed by a combination of electrical resistance heating with a coolant fluid 712 (shown in optional counter-current flow). In an alternative embodiment, the sorbent is in the form of a thin film on an electrically insulating material that is in thermal contact with a heat sink (the structure could include, for example, a relatively massive block of a heat conductive material). For desorption, the heating is so fast that a negligible portion of the heat is conducted through the insulating material and into the heat sink. Upon termination of the electrical current, the sorbent rapidly cools to the temperature of the heat sink, and a sorption cycle can begin.

Figure 8:
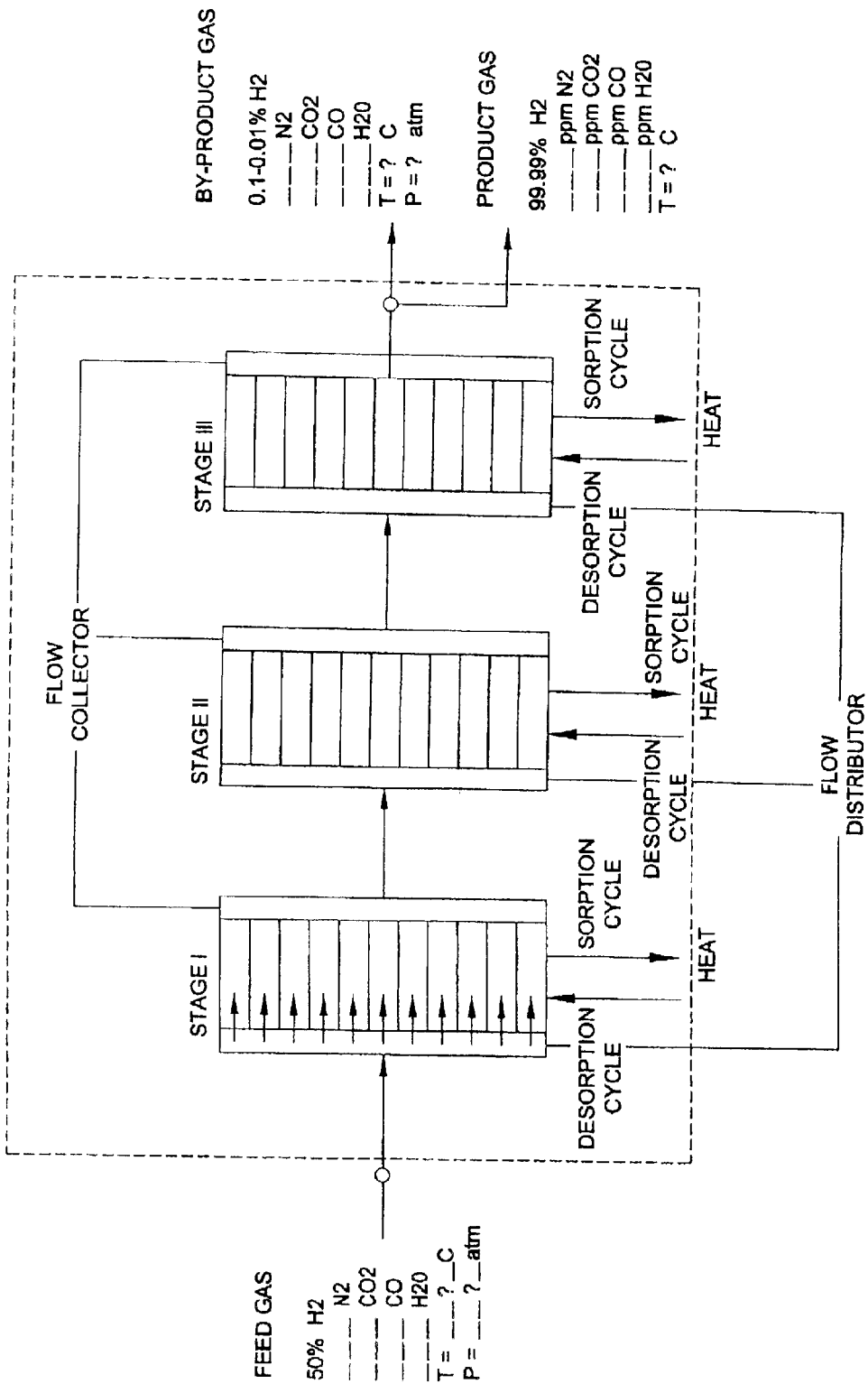
FIG. 8 schematically illustrates a multistage sorption apparatus in which multiple flow channels are utilized in each stage.

In a preferred embodiment, fast and efficient heat exchange is achieved by sandwiching a flow channel layer between heat exchanger layers. More preferably, the separation apparatus is made up of multiple alternating layers of heat exchangers and flow channels. The heat exchangers and flow channels can be manifolded into larger systems. One such system is illustrated schematically in FIG. 8. In operation of the schematically illustrated device, a fluid mixture passes into a first header and is distributed into multiple flow channels with intervening heat exchangers (not shown). A component is selectively sorbed into the sorbent in the flow channels. The component-depleted fluid is collected in a header and passed into a second unit (stage II) where more component is sorbed, and still more residual component can be removed in the flow channels in stage III. Finally, the product fluid that is depleted in at least one component is released or collected through outlet 82. In some embodiments, an inlet valve is closed, and temperature is increased. At the higher temperature, the component is desorbed and collected. If desired, a sweep fluid could be used.

The sorbent capacity could be further increased by heating down the length of a flow channel to drive off sorbed fluid while introducing feed to the beginning of a flow channel. In this technique heating is timed such that the desorbed species exits before the non-sorbed feed stream reaches the flow channel exit.

For combustible components, such as hydrogen, the system could be made more efficient by combusting a non-sorbed component that exits with the feed stream in another area (or stage) of the apparatus where desorption is occurring. Suitable conduits and valving can be used to direct the nonsorbed component stream to a combustor layer that is in thermal contact with a sorbent layer.

Numerous additional steps could be added to the inventive methods. For example, the feed fluid could be pretreated to remove constituents from the feed mixture that could poison the sorbent surface. One option is using a molecular sieve sorbent such as a zeolite in a pretreatment zone or bed. Desorption can be made faster by using a heated sweep fluid. Fluid obtained at any stage could be recycled back to an earlier stage.

The flow channel(s) and heat exchanger(s) can be a stand-alone unit or can be connected to the outlet of a reactor such as a steam reformer, water-gas shift reactor, etc. and the hydrogen separated can then be passed into another device such as a fuel cell—thus forming a power system. Systems incorporating the hydrogen sorption apparatus described herein can include: from large (up to 100+ multi million standard cubic foot per day MMSCFD) hydrogen plants to modular hydrogen generating units (~1 MMSCFD), fuel processors for distributed electricity generators, fuel processors for automotive fuel cells, and very small fuel processors for fuel cells that displace batteries in portable devices The fluid separation apparatus may be formed, for example, by bonding thin metal or composite plates to the heat exchanger surface, or by using a sorbent as the material for the walls of the heat exchanger. These plates can be quite thin—for example, one $\mu$m or less. A channeled plate for a heat exchanger could be made by techniques such as electrodischarge machining (EDM), milling, etching, vapor depositing metal or alloys, and electrolessly plating Pd metal, phosphide, and alloys. Flow channels could be manufactured by bonding three plates in which the center plate has a channel or channels cut through it, and the top and bottom plates have a sorbent-coated internal surface. Flow channels may alternatively be electrolessly plated—a technique that provides uniform deposition throughout the structure. A porous insert could be inserted into the flow channels. The plates, including the heat exchanger plates can be stacked and diffusion bonded, or sealed with the Pd-containing plate while depositing the Pd material as sorbent.

The sorption devices can be constructed from non-metallic materials, such as plastics. For temperatures below about 400° C., there are a variety of plastics that can withstand the operating temperatures for most sorption systems. Most sorption systems operate at relatively low temperatures because the capacity of a sorbent for most solutes is inversely proportional to temperature with highest capacity achieved at low temperatures. A preferred plastic material is polyimide that can be heated electrically; thus, electric heaters could be used in place of or in addition to the heat exchange fluids. Also, the sorbent or the substrate material containing the sorbent could be electrically heated, and thus avoid heating the bulk materials that are used to construct the apparatus.

The use of thin sorbent layers is a benefit to the manufacture of in the inventive devices because surface finishing processes which produce highly reliable thin coatings can be used rather than only expensive milling techniques. Such surface finishing methods are electroless plating, electrolytic plating, sputter coating, chemical vapor deposition, electropolishing, etc. These techniques also readily allow deposition of pure metals, alloys, and/or multi-layers of these. They can be operated in batch or highly economical continuous mode even in roll-to-roll processes, which can generate many thousands of square feet/day. These coated flat sheets are then cut and layered with flow dispersant and heat transfer fluid carrying layers to finish fabrication of the device. Final sealing can be done using adhesives, welding, diffusion bonding, brazing, etc., whichever is the most practical for the materials and dimensions involved.

The input fluid mixture may contain numerous gases such as: $H_2$, CO, $CO_2$, $H_2O$, $C_1$–$C_{10}$ alkanes especially $CH_4$, $C_2H_6$, $C_3H_8$, $C_4H_{10}$, naptha and other light petroleum-based feed components, $N_2$, $O_2$, Ar, ammonia, and lower alcohols, especially methanol, ethanol and propanol, and sulfurous gases and vapors such as $SO_2$, $SO_3$, $H_2S$, $CS_2$ and COS. The fluid mixture may also contain a mixture of liquids, including alkanes, alkenes, alcohols, ethers, acids, water, and other organic or inorganic components in solution.

The fluid mixture feed will have a T and P characteristic of the source, and also a desirable T and P for the purified product. It is an advantage of the invention that preconditioning the gas to a specific T and/or P is not necessary since the sorbent composition can be selected to accommodate various feed and target P and T profiles. For a particular sorbent and P-T range, the fluid mixture may flow into the flow channel at a preferred partial pressure (absolute) range of $1 \times 10^{-4}$ mbar to 20 bar; more preferably $1 \times 10^{-3}$ to 3 bar. In some embodiments, the flow channel contains internal baffling to minimize laminar flow, or is sufficiently narrow so that the gas collides with the sorbent frequently enough to allow sorption of the selected component. Flow rates through the apparatus will depend upon the device size and other factors such as the desired efficiency. In preferred modes of operation, no pumping (either for evacuation or compression) is utilized, although changes in pressure will typically occur as a result of thermal cycling.

The separation process is preferably run in multiple stages where at least one latter stage is run at a lower sorption temperature than an earlier stage. More preferably, the process includes at least 3 successive stages, each of which is conducted at a successively lower temperature range. As the partial pressure of the selected component decreases, a lower temperature is used to more effectively sorb the component. This technique provides greater overall component separation while operating at narrower average temperature swings than if the temperature range was the same in all stages.

In an apparatus, a stage is a device or portion of a device, such as a parallel array of microchannels, that acts to either sorb or desorb a component from a fluid solution. In a process, a stage is a sorption or desorption, preferably one in which equilibrium is substantially reached (at least about 85%).

Description of 3-stage Sorption Device

The premise of a 3-stage sorption device is similar to a 2-stage sorption device in that the temperature is lowest during the sorption cycle and highest during the desorption cycle. The feed is cycled from left to right (shown in FIGS. 9a–9c), or alternatively from right to left (not shown), in a continuous or semi-continuous fashion.

The primary difference between a 2-stage and a 3-stage sorption device is the addition of an additional stage between the desorption and sorption stage. Typically, there will also be an increase in recovered yield, product purity, and/or energy utilization. The additional channel may serve one or multiple purposes, including providing additional time for desorption if the sorbent has a high degree of surface heterogeneity including sites that strongly hold a solute or change temperature more slowly. The addition of a third stage may also be used to pre-cool the sorption channel prior to a feed switch. This will in effect increase the capacity of a particular stage because the temperature is equal to $T_c$ during all time of the sorption cycle.

The upper and lower temperature can be controlled by heated or cooled heat transfer fluid, water, or gas, including combustion gas or steam. Heating, which can be controlled by electrical (joule heat) as well, preferably ranges from –50 to 1000° C. more preferably 8 to 160° C. In most instances, temperature of the flow channel is controlled by the temperature of the heat exchange fluid flowing through the heat exchanger. Temperature can be continually changing; however, temperature is preferably jumped from high to low, or from low to high points with minimal transition time, generally faster than once per 10 sec, preferably 1–10 times per second, and most preferably 100–1000 times per second. The construction of the inventive device, with its good thermal conductivity, low heat capacity, and short thermal transport distances, enables rapid temperature changes in the flow channel. This ability for rapid temperature change is further enhanced where the sorbent is disposed on the walls of the flow channel. Temperature change of the Pd surface (for example, as measured by a thermocouple) is carried out at a rate of at least 20° C./sec, with a preferred range of 200 to 2000° C./sec.

The inventive process is preferably carried out over a sorption/desorption cycle time for a gaseous mixture of 0.1 to 1000 Hz; more preferably 100 to 1000 Hz. More particularly, the sorption (low T) portion of each cycle preferably occurs for 0.1 to 10 s, more preferably 0.001 to 2 s; while the desorption portion of each cycle preferably occurs for 0.1 to 1 s, more preferably 0.001 to 0.01 s.

Purity of a recovered component (using hydrogen as an example) may be improved in several ways. The total void volume is preferably minimized in the design of the TSS sorption/desorption device. Hence, fluid passageways are preferably short and small. This feature also helps decrease the time for sorption since gas diffusion and transport distances are short. For the Pd example, over 800 volume of $H_2$ gas at STP is sorbable per volume of Pd. Hence, if the sorbent volume is $10\mu$ thick and the gas compartment is $100\mu$ thick, then approximately $\frac{1}{10}^{th}$ of the original feed gas with contaminants still resides within the gas compartment. Note that it is necessary to flow hundreds of volumes of feed gas to the sorbent in order to fully load it due to the high $H_2$ absorption coefficient for Pd. Hence, in this preferred case, even with the residual gas contaminants still present in the channel after loading, about 90% of the contaminants are removed even if this residual feed gas is allowed to remain in the feed gas compartment during the desorption cycle.

A second means of handling the contaminants in the residual feed gas are to flush the gas space with a small amount of the purified $H_2$ recycled back from the purified product stream, perhaps 0.1–10% of the product gas being recycled. The more back flush the purer the hydrogen gas product. In multi-staging TSS devices, the intermediate partially purified streams also could be used for the above flush gas to improve product gas purity and energy conservation.

A third means to minimize the cross contamination between feed gas and purified product gas is to at least partially evacuate the gas compartment for a very short (<2 s, preferably less than 0.1 s) period prior to desorbing. The vacuum exposure time is kept very short to minimize losses of $H_2$ due to premature $H_2$ desorption due to the low partial pressure of $H_2$ during evacuation. Also, complete evacuation is not required, the levels of evacuation being proportional to reach a desired residual impurity level.

The methods and apparatus of the invention can be characterized by their properties.

EXAMPLES

Test apparatus was constructed using 0.5 inch stainless or low carbon steel tubing that had its external surface covered with a Pd coating of either Pd metal, Pd—P alloy or Pd—Ni alloy. Eight inches of the Pd-covered tube was jacketed in a 2-inch diameter tube having a gas inlet and pressure gauge. Cold water (8–15° C.) and 109–153° C. steam were passed through the tube for the cold and hot portions of a cycle, respectively.

Palladium was electrolessly plated as follows. A palladium solution was prepared by mixing 2.0 g $PdCl_2$, 3.8 g potassium sodium tartrate tetrahydrate, 5.12 g ethylenediamine and 0.82 g sodium hypophosphite in 200 ml water and pH adjusted to 8.5 by addition of HCl. A stainless steel bar was treated with sulfuric acid, rinsed with water and wiped with toluene to remove any grease. The stainless steel bar was then reacted for 3 minutes with a sensitizer solution prepared by dissolving 2.4 g tin sulfate and 10 ml conc. HCl in 250 ml water. The sensitized steel bar was then transferred for 1 minute to a seed solution that had been prepared by dissolving 0.0125 g $PdCl_2$ and 10 ml conc. HCl in 250 ml water. The steel bar was removed, rinsed with water and immediately plated by immersing in the palladium solution. After depositing the desired thickness, the bar was removed, rinsed with isopropyl alcohol and dried. Deionized water was used in all preparations.

Palladium was electrolytically plated as follows. An electrolytic palladium solution was prepared by mixing 2.5 g diaminepalladium (II) nitrite with 27.5 g ammonium sulfamate in 250 ml water and pH adjusted to 7.5–8.5 by addition of ammonia. A stainless steel bar was cleaned by immersion in a solution of sodium hydroxide, sodium carbonate and sodium lauryl sulfate. The steel bar was removed from this solution and wiped with toluene to remove grease. Electrical wires were attached to the bar and, while the bar was in the sodium hydroxide cleaning solution, current applied for 2 minutes at a current density of 50 A/$ft^2$. The bar was removed and immediately placed in the electrolytic palladium solution and 5 A/$ft^2$ of current applied with the steel bar as the cathode. A low carbon steel was electroplated by an analogous process.

A tube coated with Pd-nickel cermet was prepared according to manufacturer's directions.

Figure 10A:
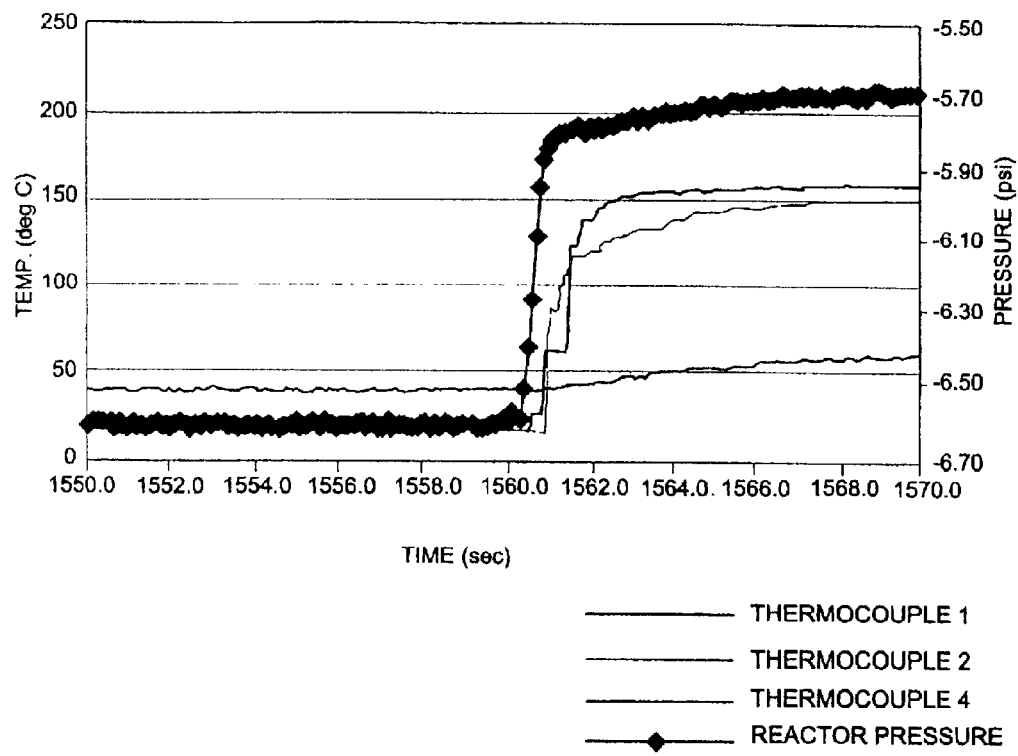
FIGS. 10a and 10b are plots of hydrogen desorption.
Figure 10B:
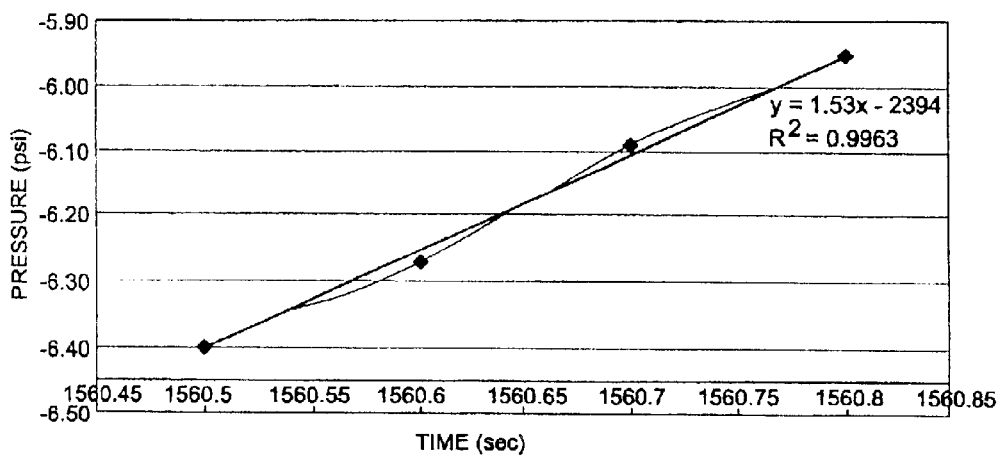

For each tube, multiple cycles were performed. Results from initial runs were discarded because residual oxygen led to spurious results (water formed), but, these runs were necessary to condition the coatings. Examples of data are shown in FIGS. 10a and 10b. The results of several runs were averaged and the results are presented in the table below. Nitrogen gas and bare stainless steel were used a reference and blank, respectively.

TABLE 1

Rates of Hydrogen Sorption and Desorption

| Gas | System | Ave. Desorption Rate (PSI/sec) | Std. Dev. (PSI/sec) | Ave. Absorption Rate (PSI/sec) | Std. Dev. (PSI/sec) |
| --- | --- | --- | --- | --- | --- |
| Nitrogen | 0.2687 g Electrolytic Pd | 0.748 | 0.064 | 0.511 | 0.034 |
| Nitrogen | 12.0591 g Cermet Pd | 0.736 | 0.028 | 0.591 | 0.017 |
| Hydrogen | 12.0591 g Cermet Pd | 1.333 | 0.159 | 1.087 | 0.032 |
| Nitrogen | 0.2687 g Electrolytic Pd | 0.770 | 0.013 | 0.589 | 0.106 |
| Hydrogen | 0.2687 g Electrolytic Pd | 1.833 | 0.057 | 1.533 | 0.099 |
| Hydrogen | Bare SS | 1.367 | 0.055 | 1.033 | 0.006 |
| Nitrogen | Bare SS | 0.756 | 0.009 | 0.627 | 0.040 |
| Nitrogen | 0.67 micron Electroless Pd | 0.746 | 0.023 | 0.650 | 0.010 |
| Hydrogen | 0.67 micron Electroless Pd | 1.553 | 0.021 | 1.170 | 0.020 |

The absorption/desorption rates are then corrected for the effect of expansion/contraction that all gases undergo due to change in temperature. In addition, rates of desorption/absorption on the method blank (a bare stainless steel bar) are subtracted in order to fully examine the effect of palladium.

$$\left[\left(\frac{\Delta p_{H_2, desorption, electroless\ Pd}}{\Delta time}\right) - \left(\frac{\Delta p_{H_2, desorption, SS}}{\Delta time}\right)\right] -$$
$$\left[\left(\frac{\Delta p_{N_2, desorption, electroless\ Pd}}{\Delta time}\right) - \left(\frac{\Delta p_{N_2, desorption, SS}}{\Delta time}\right)\right] =$$
$$\frac{\Delta p_{H_2, desorption, electroless\ Pd, corrected}}{\Delta time}$$

Again, using the electroless palladium system as an example (data from Table 1):

[(1.553 psig/sec)−(1.367 psig/sec)]−[(0.746 psig/sec)−(0.756 psig/sec)]=0.186 psig/sec Note that the average desorption rate for nitrogen on palladium is less than the desorption rate for nitrogen on stainless steel. Since the difference (0.01 psig/sec) is within the uncertainty for the values, the numbers are assumed to be essentially equal.

In order to propagate the uncertainty, the general error propagation equation is used:

For $x = f(u, v, \ldots)$

Then:

$$\sigma_x^2 \cong \sigma_u^2\left(\frac{\partial x}{\partial u}\right)^2 + \sigma_v^2\left(\frac{\partial x}{\partial v}\right)^2 + \Phi$$

Because our equation is essentially X=[A−B]−[C−D], then in this case:

$$\sigma_X^2 = \sigma_A^2\left(\frac{\partial X}{\partial A}\right)^2 + \sigma_B^2\left(\frac{\partial X}{\partial B}\right)^2 + \sigma_C^2\left(\frac{\partial X}{\partial C}\right)^2 + \sigma_D^2\left(\frac{\partial X}{\partial D}\right)^2$$

or $$\sigma_X^2 = \sigma_A^2(1)^2 + \sigma_B^2(-1)^2 + \sigma_C^2(1)^2 + \sigma_D^2(-1)^2 = \sigma_A^2 + \sigma_B^2 + \sigma_C^2 + \sigma_D^2$$

finally, $$\sigma_X = \sqrt{(0.021\ \text{psig/sec})^2 + (0.055\ \text{psig/sec})^2 + (0.023\ \text{psig/sec})^2 + (0.009\ \text{psig/sec})^2}$$

$$\sigma_X = 0.064\ \text{psig/sec}$$

So the corrected rate of hydrogen desorption for the electroless palladium system is reported to be 0.186±0.064 psig/sec. As this is a change in pressure, then psig/sec=psia/sec.

The next step is to convert from psia/sec to moles of hydrogen gas released upon desorption. This conversion is accomplished using the ideal gas law, pV=nRT. In this case, $(\Delta p/dt)V=(\Delta n/dt)RT$, where $(\Delta p/dt)$ is the rate of desorption in psia/sec (calculated above), V is the volume of the reactor (0.620±0.001 L), $(\Delta n/dt)$ is the rate of desorption in moles of hydrogen/sec, R is the ideal gas constant (1.206049 L*psia/mol*K), and T is the desorption temperature (150° C.=423 K). So, $$\frac{\Delta n}{dt} = \frac{(\Delta p/dt)V}{RT}$$

$$= \frac{(0.186\ \text{psia/sec})(0.620\ L)}{\left(\frac{1.206049\ L\cdot\text{atm}}{\text{mol}\cdot K}\right)(423\ K)}$$

$$= 0.000226\ \text{mol/sec}$$

Error is again propagated using the general error propagation equation, and this value is reported as $(2.26\pm0.78)\times10^{-4}$ mol H$_2$/sec. For the electroless palladium system, the mass of palladium plated onto the bar was determined with an electronic balance to be 0.0661±0.0001 g. Because palladium has a known density of 12.02 g/cm$^3$, the volume of palladium plated is calculated using $$V_{Pd} = \frac{\text{Mass}_{Pd}}{\text{Density}_{Pd}} = \frac{0.0661\ g}{12.02\left(\frac{g}{cm^3}\right)} = 0.005499\ cm^3\ Pd$$

As before, error is propagated and the volume of palladium plated is reported as $(5.50\pm0.01)\times10^{-3}$ cm$^3$. The amount of hydrogen gas produced per second per cubic centimeter of palladium, β, can now be calculated, $$\beta = \frac{dn/dt}{V_{Pd}} = \frac{(0.000226\ \text{mol H}_2/\text{sec})}{(0.00550\ cm^3\ Pd)} = \frac{0.0411\ \text{mol H}_2}{\text{sec}\cdot cm^3\ Pd}$$

After error propagation, β is reported to be $(4.11\pm1.41)\times10^{-2}$ mol H$_2$/sec*cm$^3$ Pd.

From FIG. 10a, the approximate desorption time is ≈0.6 seconds. This value is recorded, and then along with the desorption time for cycles five and six, an average desorption time is calculated. For the electroless palladium system, the average desorption time is 0.6±0.1 seconds. It is now possible to calculate the moles of hydrogen released upon desorption per cycle per cubic centimeter of palladium, ε, $$\varepsilon = \beta \times \text{Cycle Time}$$

$$= \left(\frac{0.0411\ \text{mol H}_2}{\text{sec}\cdot cm^3}\right)\times 0.6\ \text{seconds}$$

$$= \frac{0.0247\ \text{mol H}_2}{\text{cycle}\cdot cm^3}$$

After error propagation, $\varepsilon=(2.47\pm0.94)\times10^{-2}$ mol H$_2$/cycle*cm$^3$ Pd.

Knowing the cycle time, it is possible to calculate the theoretical number of desorption cycles per day, ν, $$\nu = \frac{(\text{seconds/day})}{(\text{seconds/cycle})}$$

$$= \frac{(86400\ \text{seconds/day})}{(0.6\ \text{seconds/cycle})}$$

$$= 144000\ \text{cycles/day}$$

which is reported as ν=144000±24000 cycles/day.

Finally, the standard cubic feet of hydrogen released per day per cubic centimeter of palladium, φ, can be calculated:

$$\varphi = \varepsilon\nu\left(\frac{22.4\ L\ H_2}{\text{mol H}_2}\right)\left(\frac{0.0353\ scf\ H_2}{L\ H_2}\right)$$

$$= \left(\frac{0.0247\ \text{mol H}_2}{\text{cycle}\cdot cm^3}\right)\left(\frac{144000\ \text{cycle}}{\text{day}}\right)$$

$$\left(\frac{22.4\ L\ H_2}{\text{mol H}_2}\right)\left(\frac{0.0353\ scf\ H_2}{L\ H_2}\right)$$

$$\varphi = \frac{2812\ scf\ H_2}{\text{day}\cdot cm^3\ Pd}$$

After error propagation, this value is reported to be:

$\varphi=(2.81\pm1.17)\times10^3$ scf H$_2$/day*cm$^3$ Pd.

Thus, in order to desorp one million standard cubic feet of hydrogen per day, the required amount of palladium, $V_{Pd,MSCF}$, is:

$$V_{Pd,MSCF} = \frac{(1000000 \; scf \; H_2/\text{day})}{\varphi}$$

$$= \frac{(1000000 \; scf \; H_2/\text{day})}{(2810 \; scf. \; H_2/\text{day} \cdot cm^3 \; Pd)}$$

$$= 356 \; cm^3 \; Pd$$

reported as $(3.56\pm1.48)\times10^2$ cm$^3$ Pd. Converting this value to mass of palladium, $m_{Pd,MSCF}$, $m_{Pd,MSCF} = V_{Pd,MSCF} \times \text{Density}_{Pd} = (356 \; cm^3 \; Pd) \times (0.01202 \; kg/cm^3 \; Pd) = 4.28 \; kg \; Pd$ reported as 4.28±1.79 kg Pd. These calculations were repeated for absorption, and for the electrolytic palladium system.
For the following conditions:

Initial pressure=−7.00+/−0.05 psig

Initial Temperature=298+/−3 K

ΔT for desorption=+139 K (423 K)(150° C.)

ΔT for absorption=−139 K (284 K) (11° C.)

Electrolessly plated Palladium (on stainless steel):

desorption rate=(2.81±1.17)×10$^3$ scf H$_2$/(day*cm$^3$ Pd) $m_{Pd,MSCF}$= 4.28±1.79 kg Pd absorption rate=(2.55±1.36)×10$^3$ scf H$_2$/(day*cm$^3$ Pd) $m_{Pd,MSCF}$= 4.71±2.51 kg Pd.

single cycle desorption=(2.47±0.94)×10$^{-2}$ mol H$_2$/cm$^3$ Pd single cycle absorption=(4.11±1.82)×10$^{-2}$ mol H$_2$/cm$^3$ Pd Electroless system characteristics:

0.0661 g Pd=5.50×10$^{-3}$ cm$^3$ Pd=6.211×10$^{-4}$ mol Pd=0.672 micron thickness over an area of 81.79 cm$^2$. Desorption Cycle Time= 0.6±0.1 sec. Absorption Cycle Time=1.1±0.2 sec.

Electrolytically plated Palladium (on low carbon steel):

desorption rate=(1.73±0.49)×10$^3$ scf H$_2$/(day*cm$^3$ Pd) $m_{Pd,MSCF}$= 6.95±1.97 kg Pd absorption rate=(2.77±0.76)×10$^3$ scf H$_2$/(day*cm$^3$ Pd) $m_{Pd,MSCF}$= 4.34±1.19 kg Pd single cycle desorption=(2.03±0.51)×10$^{-2}$ mol H$_2$/cm$^3$ Pd single cycle absorption=(3.64±0.91)×10$^{-2}$ mol H$_2$/cm$^3$ Pd Electrolytic system characteristics:

0.2687 g Pd=2.235×10$^{-2}$ cm$^3$ Pd=2.525×10$^{-3}$ mol Pd=2.80 micron thickness over an area of 79.80 cm$^2$. Desorption Cycle Time= 0.8±0.1 sec. Absorption Cycle Time=0.9±0.1 sec.

In addition, it was discovered that the sorption/desorption rates for hydrogen gas in the current invention increase with partial pressure of the hydrogen ($P_{H2}$). This increase in rate with $P_{H2}$ is illustrated in Table 2 where two sets of sorption/desorption data are compared in which the $P_{H2}$ of the feed gas was varied by about a factor of 2.17.

TABLE 2

| Sorbent | $P_{H2}$ (psia) | Observed Sorption Rate (psi/sec) | Observed Desorption Rate (psi/sec) | Temperature Jump Range (° C.) |
|---|---|---|---|---|
| Pd—P alloy (prepared by electroless plating) | 7.600 | 1.170 | 1.553 | 107 |
| Pd—P alloy (prepared by electroless plating) | 16.526 | 2.364 | 2.654 | 83 |

Although we do not wish to be bound by any theories, this unexpected result for the desorption case, which normally may not be expected to show a $P_{H2}$ dependence (Laidler, K. J., "Chemical Kinetics", McGraw-Hill (New York, N.Y.), 1965, p259ff), is suspected might be due to the higher loading of H$_2$ in the sorbent during the sorption cycle. This feed pressure benefit is significant as the higher rate allows even lower temperature jump ranges to be employed to practice the invention. Such shorter jump times reduces process cycle times and heat transfer requirements, thereby decreasing energy requirements and increasing the productivity of purified hydrogen for a given apparatus design and configuration.

Figure 11:
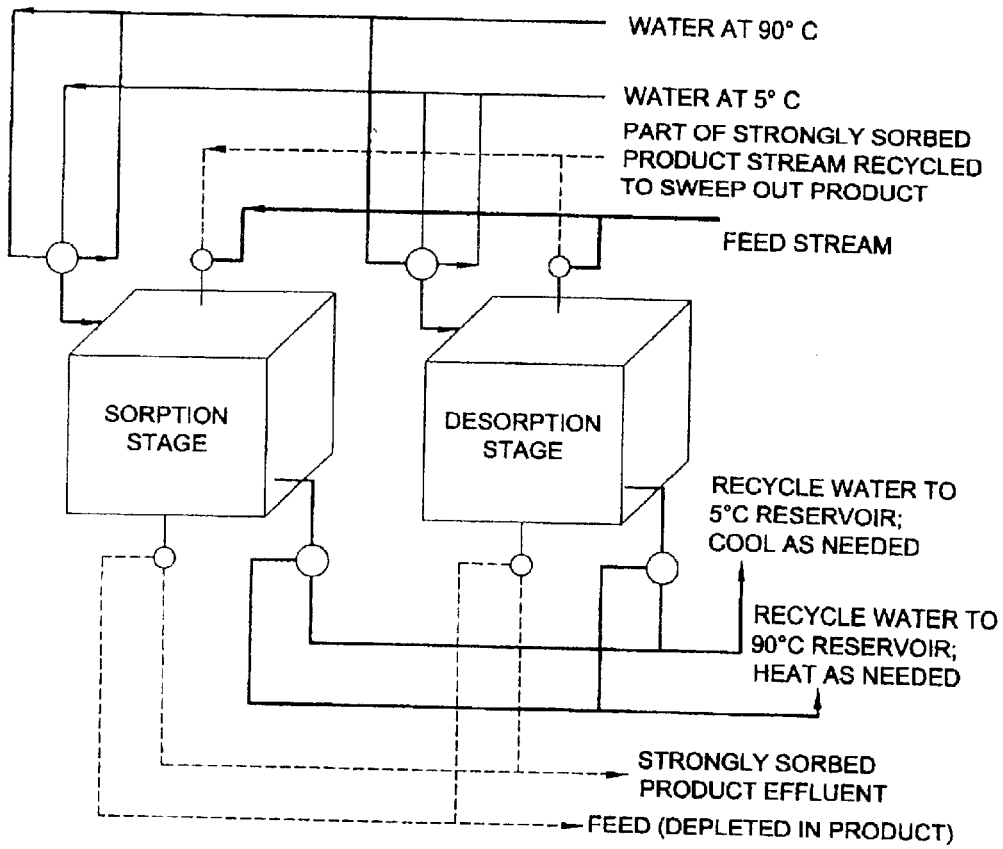
FIG. 11 schematically illustrates a 2 stage sorption process. The open circles represent valves that control the flow of the heat exchange fluids. The darkened circles represent valves that control flow of product fluids.
Figure 12:
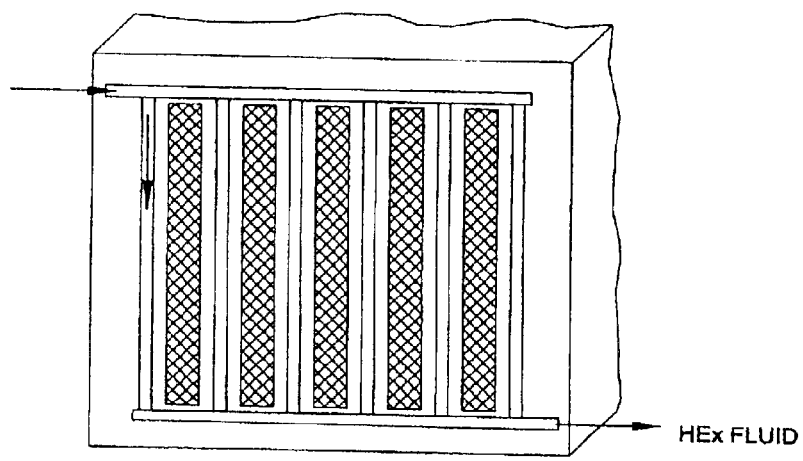
FIG. 12 schematically illustrates a microchannel device that can function as a stage in a sorption process. The criss-crossed areas indicate a porous sorbent and the open lines represent heat exchanger channels.

Calculated Example Comparing a Conventional Staged Sorption Device Vs. a Microchannel-Based Staged Sorption Device A staged microchannel thermal swing sorption device is shown in FIGS. 11 and 12. The total sorption time for this two-stage device is slightly less than 1 second, where the sorption time is set between 0.4 sec and 1 sec. For the example design, a sorption time of 0.6 sec is selected. The anticipated results, including sorption times and hardware volume of this device are compared to reported values for a cyclic sorption device described in the literature. For clarity, a sorption time is defined in this example as the time during which the feed flows through one stage as a means for comparing devices that require different numbers of stages to achieve a given separation.

The sorption time in the conventional 4-stage sorption device was on the order of 60 seconds, and the sorption time in 2-stage the microchannel device is 0.6 seconds. This 100×improvement also comes with a reduction in the active sorbent volume. The total sorbent hardware volume in the conventional example is roughly 3 cubic inches and the required sorbent loading was 38 gm. In the microchannel sorption device (that also handles an increase in the solute level of 5×over the conventional example), the required active sorbent volume was 0.6 cubic inches and the required sorbent loading is 0.89 gm. This inventive example shows a 50×reduction in the amount or weight of active sorbent agent required to achieve a given separation. This example also shows a reduction in the sorbent volume of over 5×.

Further improvements are possible through optimization of the design variables.

Conventional Staged Sorption Device

A conventional staged sorption device was described by Tonkovich and Carr in 1996. The separation of propylene from dimethyl ether in a gaseous solution also containing nitrogen was achieved by moving the feed point past fixed sorption beds.

Stages were comprised of a conventional packed bed of 60/80 mesh pellets of Alltech Chromosorb 101. At ambient conditions, the dimethyl ether is more strongly sorbed than the propylene. Nitrogen does not sorb under these conditions. For the described system of either 3 or 4 stages (optimal), each column contains roughly 9.5 g of sorbent placed in 0.5" OD 12" long stainless steel tubes. A typical void fraction of 0.4 for a packed bed is assumed. At a nitrogen flowrate of 500 mL/min, the breakthrough time for dimethyl ether is 102 sec, and for propylene is 42 seconds. The inlet mole fraction of propylene was 0.035, and the inlet mole fraction of dimethyl ether is 0.01. The total flowrate was roughly 523 mL/min. At this flowrate and bed volume, the dead time within an individual stage (column) was on the order of 0.5 sec. The goal of this device was to produce two ultrahigh purity product streams for this dilute multi-component mixture.

The described process required the addition of an additional column and isolated purge gas to completely desorb residual amounts of the strongly sorbed solute (dimethyl ether) from the column (stage) immediately prior to a feed switching to create an ideally clean column. Sorption times, or the time at which the feed is switched to an adjacent column, experimentally ranged from 50 to 81 seconds. In all cases, the feed switching time must be set between the breakthrough times of the solutes to be separated.

In the example of a ternary separation or higher, the feed switching time would be ideally selected at a value whose multiple would make successive feed switchings fall between successive separated solutes. As an example, if an additional solute C was added to the binary separation mixture of dimethyl ether and propylene, such that its breakthrough time was 200 seconds, then the selection of a switching time of 80 seconds would be sufficient. In the first stage, the propylene would be separated from a mixture of dimethyl ether and C. In the second stage at a time of 160 seconds, the dimethyl ether would elute from the stage leaving the very strongly sorbed C behind. In the final stage at a time of 240 seconds, the very strongly sorbed C would elute and be removed from the system.

In summary, for this example a total sorbent weight of 38 gm was required to separate the binary mixture of propylene and dimethyl ether. The total sorbent volume was roughly 3 cubic inches or 49 cubic centimeters.

Microchannel-based Staged Sorption Device

The use of a microchannel-based thermal swing sorption device will have distinct advantages over the system described in the literature. Initially, the use of thermal swing sorption will reduce the likelihood of requiring an additional purge column for the express purpose of cleaning a stage prior to a feed switching. By heating the desorption stage, the strongly sorbed dimethyl ether will elute more quickly. The other distinct advantage of the thermal swing microchannel-based separation is the decreased sorption and desorption time (and thus decreased hardware and sorbent volume).

An envisioned device design is shown in FIGS. 10 and 11. A stage in the microchannel device is a parallel array of 5 identical interleaved sorbent-containing microchannels with 6 heat exchange microchannels. The sorbent-containing microchannels may be filled with a flow-through engineered sorbent. The sorbent is 0.03" wide (750 microns) and placed in an aluminum device next to adjacent microchannel heat exchange channels.

The same active sorbent agent, Chromosorb 101 is deposited or coated on a porous nickel or aluminum foam. Each sorption microchannel is 2 in long, and 1 in high. The total volume of a sorbent-containing microchannel is 0.06 cubic inches, or about 1 cubic centimeter. The volume is nearly completely filled with the porous engineered sorbent. The engineered sorbent substrate (porous nickel or aluminum) is roughly 90% porous, and 10% metal. It is envisioned to coat the engineered sorbent substrate with Chromosorb 101 to a weight loading of 10% (that is sorbent is added up to 10% of the metal weight). The total weight of active sorbent in one channel of the new system is now 1 cc×8.9 gm/cc×0.1 metal density×0.1 sorbent loading~0.089 gm of sorbent. The sorbent loading for one stage consisting of 5 channels is 0.445 gm. The total sorbent loading for the entire 2-stage device is 0.89 gm. This loading per stage is roughly 4.7% of the per-stage loading in the literature example. The total loading for the microchannel device is roughly 2.3% of the loading in the literature example.

In the conventional device a sorbent loading of 9.5 gm gave a propylene breakthrough time of 42 seconds for a feed mixture of 0.035-mole fraction in a total flow stream of 523 mL/min. Subtracting the dead time for the system of 0.5 second in the stage and an estimated 0.5 second in the interconnecting pipes, gives a sorbent capacity of 0.035×523 mL/min/9.5 gm×41 seconds equals 1.32 mL of propylene per gm of sorbent. For the dimethyl ether, the sorbent capacity equals 0.01×523 mL/min/9.5 gm×101 seconds, or 0.93 mL of dimethyl ether per gm of sorbent.

The anticipated breakthrough time, for a mixture of 0.175 mole fraction propylene, 0.05 mole fraction dimethyl ether, and 0.775 mole fraction nitrogen flowing at about 523 mL/min at room temperature over a sorbent weight of 0.445 gm per stage is about 0.39 sec for propylene, and about 0.95 second for dimethyl ether based upon using similar sorbent capacities calculated from the reported values in Tonkovich and Carr 1996.

In the microchannel device, it is anticipated that the sorption cycle will occur at room temperature, while the desorption cycle will occur at a higher temperature. It is anticipated that a temperature rise of 20 to 50° C. should be sufficient to drive off the sorbed dimethyl ether during the desorption cycle. Heating and cooling will be achieved through the use of a liquid heat transfer fluid, water, to reduce the convective resistance to heat transfer. During the sorption cycle, water at 5° C. will enter the adjacent interleaved heat transfer microchannels to reduce the temperature to 20° C. in the sorption stage. During the desorption cycle, water at 90° C. will flow through the adjacent interleaved microchannel heat transfer channels to raise the temperature of the desorption stage to 40° C.

The feed switching time must be set between the breakthrough times of the two solutes (0.39 sec and 0.95 sec), and is selected at 0.6 sec. At this switching time, there is sufficient time for the heat transfer fluid to cool and heat the sorption and desorption stage respectively.

Time for Mass Transfer in the Microchannel-Based Sorption Device

The characteristic time for mass transfer in a microchannel based engineered sorbent is defined in (21). The average size of the pore opening in a porous nickel or aluminum foam is between about 200 and 250 microns. The diffusivities of propylene and dimethyl ether in a nitrogen solution at room temperature and 1 atm are about 0.1 $cm^2/s$ and 0.12 $cm^2/s$ respectively as calculated by the Chapman-Enskog theory. Using an average value of 0.11 $cm^2/s$, the characteristic mass transfer time for both solutes is about 0.02 seconds. For this example, a feed switching time of 0.6 seconds, will provide on the order of 30 equilibrium stages for separation. This is more than sufficient to achieve a good separation of the two solutes in a microchannel.

$$\tau_{eng-sorbent} = \frac{x^2}{D_e} = \frac{0.025^2 \text{ cm}^2}{\frac{0.11 \text{ cm}^2/s}{3}} = 0.017 \text{ seconds} \sim 0.02 \text{ seconds} \quad (21)$$

Time for Heat Transfer in the Microchannel-Based Sorption Device

For the microchannel-based sorption system that is dominated by conduction resistance not convection resistance (e.g., a liquid heat transfer fluid not a gaseous heat transfer fluid), then the characteristic time for heat transfer is defined by equation (22–24).

The temperature of the sorption and desorption stages are cycled between 20° C. and 40° C. respectively through the use of a heat transfer fluid that is cycled between 5° C. and 90° C. respectively.

$$y_{sorption} = \frac{T - T_{ss}}{T0 - T_{ss}} = \frac{20C - 5C}{90C - 5C} = 0.18 \quad (22)$$

$$y_{desorption} = \frac{T - T_{ss}}{T0 - T_{ss}} = \frac{40C - 90C}{5C - 90C} = 0.59 \quad (23)$$

$$t = (\text{factor})(x2)/\text{alpha} \quad (24)$$

Characteristic Time for Heat Transfer During Sorption

The conduction time through the metal web between the heat transfer channel and the sorbent containing microchannel is shown in equation (25), where x=0.00025 m, alpha= 9.16×10$^{-5}$ m$^2$/s for an aluminum web. The conduction time through the engineered sorbent is shown in Equation (26), where x=0.000375 m (half width of engineered sorbent because of heat transfer symmetry between the the interleaved microchannels) and alpha is roughly 4×10$^{-5}$ m$^2$/s. The "factor" is determined from empirical heat transfer curves for conduction-limited heat transfer in a rectangular channel.

$$t = 0.8 \frac{0.00025^2 m^2}{9.16 \times 10^{-5} \frac{m^2}{s}} = 0.0005 \text{ sec} \quad (25)$$

$$t = 0.8 \frac{0.000375^2 m^2}{4 \times 10^{-5} \frac{m^2}{s}} = 0.0028 \text{ sec} \quad (26)$$

The total characteristic time for heat transfer through the engineered sorbent is less than about 0.003 second during the sorption cycle for the temperatures described in this example. This implies that a fast switch of the heat exchange fluid at the start of a 0.6-sec sorption cycle will take less than 0.5% of the total time for sorption.

Characteristic Time for Heat Transfer During Desorption

The total characteristic time for heat transfer during the desorption cycle through the metal web between the heat exchange microchannel and the engineered sorbent is shown in Equation (27). The time for conduction through the engineered sorbent is shown in Equation (28). The total time for conduction during the desorption cycle is less than about 0.003 seconds. This implies that a fast switch of the heat exchange fluid at the start of a 0.6-second sorption cycle will take less than 0.5% of the total time for desorption.

$$t = 0.7 \frac{0.00025^2 \ m^2}{9.16 \times 10^{-5} \frac{m^2}{s}} = 0.0005 \text{ sec} \quad (27)$$

$$t = 0.7 \frac{0.000375^2 \ m^2}{4 \times 10^{-5} \frac{m^2}{s}} = 0.0025 \text{ sec} \quad (28)$$

Estimation of Dead Time During Cycle

The full cycle time for this device will need to include the dead time in addition to the time for sorption and desorption. Immediately after a feed switching, there will take an amount of time for the coolant stream (in the case of sorption) or hot stream (in the case of desorption) to travel from the 4-way solenoid valve (configuration shown in FIG. A), through the interconnecting pipes, through the header and finally through the microchannel itself. As an example, an ASCO solenoid valve may be conveniently used at a cycle rate of 30 Hz.

For a total coolant flowrate of 10 L/min, an estimated time for convection through the heat transfer microchannel (0.02" wide, and same height and length as sorbent microchannel) is calculated as the volume divided by the flowrate. The channel volume is 2 in×1 in×0.02"=0.02 cubic inches, or 0.13 cubic centimeters. The flowrate through an individual heat exchange microchannel (assuming 5 sorbent microchannels interspersed within 6 heat transfer microchannels) is roughly 1667 mL/min. The time for convective flow through an individual parallel heat transfer microchannel is about 0.005 sec.

The time for convective flow through the header is estimated by dividing the header volume by the total flowrate (10 L/min). The header volume is estimated as the height of the face (1")×a header depth required for uniform flow distribution (0.25")×the width of the array of channels (6×0.02"+5×0.03"+10 webs×0.01"=0.37"), which equals 0.09 cubic inches or about 1.5 cubic centimeters. The dead time in the header is 1.5 cubic centimeters divided by 10 L/min, which equals about 0.009 sec.

The time for convection in the interconnecting pipes from the 4-way solenoid valve is estimated as a 1" flow length for a ⅜$^{th}$ in pipe. The total volume is 0.0352 cubic inches or 0.58 cubic centimeters. The dead time for convection through this pipe is roughly 0.004 seconds.

The total dead time on the heat transfer side is 0.005 sec for convection through the channels, plus 0.009 sec for convection through the header, plus 0.004 sec for convection through the interconnecting pipes. The total dead time is roughly 0.018 sec.

For a total cycle time of 0.6 sec, roughly 0.018 seconds is wasted as part of the dead time on the heat transfer side. This equates to roughly 3% of the total cycle time, which is acceptable.

If a lower flowrate is desired for the heat transfer fluid, then the dead time on the heat transfer side will be a larger percentage of the total cycle time. However, further elimination of volume in either the flow header and/or the interconnecting pipes could reduce transfer side dead time.

In summary, the microchannel-based sorption device requires 0.445 gm of sorbent per stage, for a total sorbent volume of 0.89 gm per system. The cycle time selected is 0.6 sec.

While preferred embodiments of the present invention have been described, it will be apparent to those skilled in the art that many changes and modifications may be made without departing from the invention in its broader aspects.

The appended claims are therefore intended to cover all such changes and modifications as fall within the true spirit and scope of the invention.

We claim:

1. A method of separating a fluid component from a mixture comprising:
   a first step comprising sorbing a fluid component, this first step comprising passing a fluid mixture into a flow channel at a first temperature;
   wherein the flow channel comprises a sorbent within the channel, and
   wherein flow through the channel is constrained such that in at least one cross-sectional area of the channel that comprises the sorbent, the height of the flow channel is 1 cm or less;
   a second step comprising increasing the temperature of the sorbent, this second step comprising adding energy from an energy source; and
   desorbing a fluid component at a second temperature and obtaining a fluid component that was sorbed in the first step, wherein the second temperature is higher than the first temperature; and
   wherein the first and second steps, combined,
   for a non-condensed fluid mixture take 10 seconds or less and wherein at least 20% of the gaseous component sorbed in the first step is desorbed from the sorbent; or
   for a liquid mixture take 1000 seconds or less and wherein at least 20% of the fluid component sorbed in the first step is desorbed from the sorbent.

2. The method of claim 1 wherein substantially all the fluid flowing through the flow channel flows through a porous sorbent.

3. The method of claim 1 wherein the sorbent is a porous sorbent having a pore volume of 5 to 95% wherein at least 20% of the sorbent's pore volume is composed of pores in the size range of 0.1 to 300 microns.

4. The method of claim 3 wherein the energy sources comprises a heat exchanger that comprises an array of heat exchanger microchannels.

5. The method of claim 1 wherein the flow channel is disposed in a planar array of flow channels.

6. The method of claim 4 wherein the flow channel is disposed in a planar array of flow channels that is disposed between planar arrays of heat exchanger microchannels.

7. The method of claim 1 wherein the sorbent is disposed on a thermally-conductive felt or continuously porous foam.

8. The method of claim 4 wherein flow of a fluid through the heat exchanger is cross-flow or counter-flow in relation to fluid flow through the flow channel.

9. The method of claim 3 wherein the energy source comprises a heat exchanger, and further wherein a heat transfer liquid flows through the heat exchanger.

10. The method of claim 1 wherein the energy source comprises a heat exchanger, and further wherein a heat transfer liquid comprising water flows through the heat exchanger.

11. The method of claim 1 wherein conditions for sorption or desorption are selected to coincide with a phase change of heat transfer fluid.

12. The method of claim 3 wherein sorption is conducted at 1 to 1000 psig.

13. The method of claim 3 wherein a feed stream is distributed among multiple flow channels each of which is sandwiched between heat exchangers.

14. The method of claim 3 wherein the flow channel has a height of 2 mm or less.

15. The method of claim 3 wherein the porous sorbent has a thickness of between 100 and 500 microns.

16. The method of claim 14 wherein at least 50% of the sorbent's pore volume is composed of pores in the size range of 0.3 to 200 microns.

17. The method of claim 1 wherein sorbent comprises sorbent fibers.

18. The method of claim 3 wherein heat from the sorbent is transferred through a metal channel wall to fluid in a heat exchanger.

19. The method of claim 3 wherein the flow channel comprises a bulk flow path and a porous sorbent plug.

20. The method of claim 18 comprising laminar flow through the flow channel.

21. The method of claim 3 comprising flowing a fluid through at least two flow channels and further comprising mixing gases from the at least two flow channels in a mixing chamber.

22. The method of claim 18 wherein bulk flow from at least two flow channels flows into a porous sorbent.

23. The method of claim 3 comprising adding heat from an electrically resistive heating element to desorb the fluid component.

24. The method of claim 3 wherein desorption is conducted by heating down the length of a flow channel to drive off sorbed fluid while introducing feed to the beginning of the flow channel.

25. The method of claim 3 further comprising a step of pretreating the gas fluid mixture to remove constituents.

26. The method of claim 3 wherein the desorbed fluid component is recycled back into the flow channel.

27. The method of claim 1 wherein the fluid mixture comprises sulfurous gases.

28. The method of claim 3 wherein the fluid mixture comprises a gas selected from the group consisting of: $H_2$, CO, $CO_2$, $H_2O$, $CH_4$, $C_2H_6$, $C_3H_8$, $N_2$, $O_2$, Ar, $NH_3$, $CH_3OH$ and $C_2H_5OH$.

29. The method of claim 3 wherein the fluid mixture flows into the flow channel at a partial pressure of $1 \times 10^{-3}$ to 20 bar.

30. The method of claim 29 wherein no pumping is utilized.

31. The method of claim 30 wherein at least 85% of equilibrium is reached during sorption.

32. The method of claim 31 wherein the step of sorbing a fluid component occurs for 0.1 to 10 seconds.

33. The method of claim 31 wherein the sorption/desorption cycle time is 100 to 1000 Hz.

34. The method of claim 3 wherein, prior to the step of desorbing a fluid component, the flow channel is at least partially evacuated for a time of less than 2 seconds.

35. A method of separating a fluid component from a mixture comprising:
   a first step comprising sorbing a fluid component, this first step comprising passing a non-condensed fluid mixture into a flow channel at a first temperature;
   wherein the flow channel comprises a sorbent within the channel, and
   wherein flow through the channel is constrained such that in at least one cross-sectional area of the channel that comprises the sorbent, the height of the flow channel is 1 cm or less;
   a second step comprising increasing the temperature of the sorbent, this second step comprising adding energy from an energy source; and
   desorbing a fluid component at a second temperature and obtaining a fluid component that was sorbed in the first step, wherein the second temperature is higher than the first temperature; and wherein the first and second steps, combined, take 10 seconds or less and wherein at least 20% of the fluid component sorbed in the first step is desorbed from the sorbent.

36. The method of claim 35 wherein the sorbent is a porous sorbent having a pore volume of 5 to 95% wherein at least 20% of the sorbent's pore volume is composed of pores in the size range of 0.1 to 300 microns.

37. The method of claim 35 wherein the energy source comprises a heat exchanger that comprises an array of heat exchanger microchannels.

38. The method of claim 37 wherein the flow channel is disposed in a planar array of flow channels.

39. The method of claim 35 wherein the flow channel is disposed in a planar array of flow channels that is disposed between planar arrays of heat exchanger microchannels.

40. The method of claim 35 wherein sorption is conducted at 1 to 1000 psig.

41. The method of claim 35 wherein the flow channel has a height of 2 mm or less.

42. The method of claim 39 wherein the flow channel has a height of 2 mm or less.

43. The method of claim 41 comprising adding heat from an electrically resistive heating element to desorb the fluid component.

44. The method of claim 42 wherein desorption is conducted by heating down the length of a flow channel to drive off sorbed fluid while introducing feed to the beginning of the flow channel.

45. The method of claim 41 wherein the desorbed fluid component is recycled back into the flow channel.

46. The method of claim 42 wherein the fluid mixture comprises a gas selected from the group consisting of: $H_2$, $CO$, $CO_2$, $H_2O$, $CH_4$, $C_2H_6$, $C_3H_8$, $O_2$, $Ar$, $NH_3$, $CH_3OH$ and $C_2H_5OH$.

47. The method of claim 46 wherein no pumping is utilized.

48. The method of claim 41 wherein at least 85% of equilibrium is reached during sorption.

49. The method of claim 41 wherein the sorption/desorption cycle time is 0.1 to 1 second.

50. The method of claim 41 wherein the sorption portion of each cycle occurs for 0.001 to 2 s, while the desorption portion of each cycle occurs for 0.1 to 1 s.

51. A method of separating a fluid component from a mixture comprising:

a first step comprising sorbing a fluid component, this first step comprising passing a liquid mixture into a flow channel at a first temperature;

wherein the flow channel comprises a sorbent within the channel, and wherein flow through the channel is constrained such that in at least one cross-sectional area of the channel that comprises the sorbent, the height of the flow channel is 1 cm or less;

a second step comprising increasing the temperature of the sorbent, this second step comprising adding energy from an energy source; and desorbing a fluid component at a second temperature and obtaining a fluid component that was sorbed in the first step, wherein the second temperature is higher than the first temperature; and wherein the first and second steps, combined, take 1000 seconds or less and wherein at least 20% of the fluid component sorbed in the first step is desorbed from the sorbent.

52. The method of claim 51 wherein the energy source comprises a heat exchanger that comprises an array of heat exchanger microchannels.

53. The method of claim 51 wherein the flow channel is disposed in a planar array of flow channels that is disposed between planar arrays of heat exchanger microchannels.

54. The method of claim 51 wherein the desorbed fluid component is recycled back into the flow channel.

55. The method of claim 51 wherein the sorption/desorption cycle time is 100 to 1000 seconds.

* * * * *